United States Patent
Ward et al.

(10) Patent No.: US 9,451,232 B2
(45) Date of Patent: Sep. 20, 2016

(54) REPRESENTATION AND CODING OF MULTI-VIEW IMAGES USING TAPESTRY ENCODING

(71) Applicant: Dolby Laboratories Licensing Corporation, San Francisco, CA (US)

(72) Inventors: Gregory John Ward, Berkeley, CA (US); Scott Daly, Kalama, WA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 333 days.

(21) Appl. No.: 14/237,548

(22) PCT Filed: Sep. 27, 2012

(86) PCT No.: PCT/US2012/057616
§ 371 (c)(1),
(2) Date: Feb. 6, 2014

(87) PCT Pub. No.: WO2013/049388
PCT Pub. Date: Apr. 4, 2013

(65) Prior Publication Data
US 2014/0198182 A1    Jul. 17, 2014

Related U.S. Application Data

(60) Provisional application No. 61/541,050, filed on Sep. 29, 2011.

(51) Int. Cl.
H04N 19/597    (2014.01)
H04N 13/00     (2006.01)

(52) U.S. Cl.
CPC ...... *H04N 13/0011* (2013.01); *H04N 13/0029* (2013.01); *H04N 13/0048* (2013.01); *H04N 19/597* (2014.11)

(58) Field of Classification Search
CPC .......... H04N 13/0011; H04N 19/597; H04N 13/0048; H04N 13/0029
See application file for complete search history.

(56) References Cited

U.S. PATENT DOCUMENTS 6,055,012 A * 4/2000 Haskell ............ H04N 13/0014
                                                   348/48
7,567,703 B2 * 7/2009 Jones ....................... G06K 9/32
                                                   382/154

(Continued)

FOREIGN PATENT DOCUMENTS

CN      101742349      6/2010
CN      101902657      12/2010

(Continued)

OTHER PUBLICATIONS

Wallick, M.N.; Automatic Organization of Large Photo Collections, Ph.D. Disertation, University of Wisconsin-Madison, Jun. 2007.*

(Continued)

*Primary Examiner* — Sath V Perungavoor
*Assistant Examiner* — Philip Dang

(57) ABSTRACT

Representation and coding of multi-view images using tapestry encoding are described. A tapestry comprises information on a tapestry image and a world coordinates map associated with the tapestry image, each of which may contain information from one or more perspectives of a scene. Perspective images of a scene can be generated from the tapestry image and the world coordinates map.

25 Claims, 12 Drawing Sheets

(56) References Cited

U.S. PATENT DOCUMENTS

| | | | |
|---|---|---|---|
| 7,796,134 B2 * | 9/2010 | Vesely | G02B 27/2221 345/1.1 |
| 8,155,461 B2 | 4/2012 | Moon et al. | |
| 8,280,149 B2 | 10/2012 | Yu et al. | |
| 8,384,763 B2 | 2/2013 | Tam et al. | |
| 2005/0286759 A1 * | 12/2005 | Zitnick | G06T 7/0077 382/154 |
| 2007/0279494 A1 * | 12/2007 | Aman | G01S 3/7864 348/169 |
| 2009/0015662 A1 | 1/2009 | Kim et al. | |
| 2009/0028248 A1 | 1/2009 | Kitahara | |
| 2009/0185759 A1 | 7/2009 | Liu | |
| 2010/0026712 A1 | 2/2010 | Aliprandi | |
| 2010/0215251 A1 | 8/2010 | Gunnewiek et al. | |
| 2010/0231689 A1 | 9/2010 | Bruls | |
| 2010/0259595 A1 | 10/2010 | Trimeche | |
| 2010/0271511 A1 | 10/2010 | Ma et al. | |
| 2011/0026809 A1 | 2/2011 | Jeong et al. | |
| 2011/0058021 A1 | 3/2011 | Chen | |
| 2011/0063420 A1 | 3/2011 | Masuda | |
| 2011/0074924 A1 | 3/2011 | Barenbrug | |
| 2011/0080466 A1 | 4/2011 | Kask et al. | |
| 2011/0115793 A1 * | 5/2011 | Grycewicz | G06T 3/4069 345/428 |
| 2011/0205226 A1 | 8/2011 | Gremse et al. | |
| 2011/0242278 A1 | 10/2011 | Yang et al. | |
| 2011/0261050 A1 | 10/2011 | Smolic et al. | |
| 2011/0304708 A1 | 12/2011 | Ignatov | |
| 2012/0062548 A1 | 3/2012 | Pan et al. | |
| 2012/0162193 A1 | 6/2012 | Bae et al. | |
| 2013/0027513 A1 | 1/2013 | Corral-Soto | |
| 2014/0176539 A1 | 6/2014 | Tsubaki et al. | |
| 2014/0198182 A1 | 7/2014 | Ward et al. | |
| 2014/0347444 A1 | 11/2014 | Naske | |

FOREIGN PATENT DOCUMENTS

| | | |
|---|---|---|
| EP | 2 360 930 A1 * | 8/2011 |
| WO | 2009/091563 | 7/2009 |
| WO | WO 2009/091563 A1 * | 7/2009 |
| WO | 2010/024925 | 3/2010 |
| WO | WO 2010/024925 A1 * | 3/2010 |
| WO | 2012/062652 A1 | 5/2012 |
| WO | 2012/097802 A2 | 7/2012 |
| WO | 2013/014177 A1 | 1/2013 |
| WO | 2013/054240 A1 | 4/2013 |
| WO | 2013/062944 A1 | 5/2013 |
| WO | 2013/068271 A2 | 5/2013 |

OTHER PUBLICATIONS

Rother, C. Digital Tapestry, Entertainment Design. Mar. 1, 2005, vol. 39 Issue 3; Penton Media, Inc.*

Cheng, X.; Generation of Layered Depth Images From Multi-View Video, IEEE International Conference on Image Processing, 2007, pV-228.*

Huynh-Thu, Q., The Importance of Visual Attention in Improving the 3D-TV Viewing Experience: Overview and New Perspectives, IEEE Transactions on Broadcasting, Institute of Electrical and Electronics Engineers, 2011, 57 (2), pp. 421-431.*

Simmons, M., Tapestry: A Dynamic Mesh-based Display Representation for Interactive Rendering.*

Grossman, J. et al, "Point Sample Rendering," Rendering Techniques '98, Proceedings of the Eurographics Workshop, Jun. 29-Jul. 1, 1998.

Rademacher, P. et al, "Mutliple-Center of Projection Images," Computer Graphics Proceedings, Proceedings of Siggraph Annual International Conference on Computer Graphics and Interactive Techniques, vol. 423, pp. 199-206, Jan. 1, 1998.

Reinhard, E. et al, "High Dynamic Range Imaging: Acquisition, Display, and Image-Based Lighting," Morgan Kauffmann Publishers, Nov. 29, 2005.

Simmons, M. et al, "Tapestry: Dynamic Mesh-Based Display Representation for Interactive Rendering," Eurographics Workshop on Rendering, Jun. 26-28, 2000.

Lang, M. et al, "Nonlinear Disparity Mapping for Stereoscopic 3D," ACM Transactions on Graphics, Jul. 26, 2010.

Oh, K. et al, "Hole Filling Method Using Depth Based In-Painting for View Synthesis in Free Viewpoint Television and 3D Video," Picture Coding Symposium, pp. 1-4, May 6-8, 2009.

Yoon, S. et al, "A Framework for Multi-View Video Coding Using Layered Depth Images," Proceedings of the 6th Pacific Rim Conference on Advances in Multimedia Information Processing, pp. 431-442, Jan. 1, 2005.

Ohm, J. et al, "Incomplete 3D Representation of Video Objects for Multiview Applications," Proceedings of the European Conference on Multimedia Applications, Services, and Techniques, pp. 427-432, May 26, 1998.

Cheng, X. et al, "Generation of Layered Depth Images from Multi-View Video," IEEE International Conference on Image Processing, pp. V-225-V-228, Sep. 1, 2007.

Shade, J. et al, "Layered Depth Images," Proceedings of the 25th Annual Conference on Computer Graphics and Interactive Techniques, pp. 231-242, Jul. 19, 1998.

http://en.wikipedia.org/wiki/Free_viewpoint_television, Oct. 1, 2006.

Kilpatrick, M., http://www.readwriteweb.com/archives/nokias_vision_of_augmented_reality_video.php, Sep. 8, 2009.

http://www.layar.com/.

Callari, R., http://inventorspot.com/articles/top_ten_augmented_reality_devices_32462, Feb. 3, 2013.

Tyler, C. et al, "Mechanisms of Steroscopic Processing: Stereoattention and Surface Perception in Depth Construction," Perception, vol. 24, Issue 2, pp. 127-153, 1995.

Gunnewiek, R.K. et al. "Coherent Spatial and Temporal Occlusion Generation" SPIE 7237, Stereoscopic Displays and Applications, Feb. 18, 2009. 10 pages.

Ince, S. et al. "Occlusion-Aware View Interpolation" EURASIP Journal on Image and Video Processing, vol. 2008, 15 pages.

Jain, A.K. et al. "Efficient Stereo-to-Multiview Synthesis" 2011 IEEE International Conference on Acoustics, Speech and Signal Processing, May 22-27, 2011, pp. 889-892.

Jang, W-S. et al. "Efficient Disparity Map Estimation Using Occlusion Handling for Various 3D Multimedia Applications" IEEE Transactions on Consumer Electronics, vol. 57, No. 4, Nov. 2011, pp. 1937-1943.

Jeong, Y.J. et al. "Depth-Image-Based Rendering (DIBR) Using Disocclusion Area Restoration" SID Symposium Digest of Technical Papers, vol. 40, Issue 1, pp. 119-122, Jun. 2009—Abstract Only.

Keribiou, P. "3D4YOU, WP3-Deliverable D3.3.2, Comparative Study and Recommendations" Dec. 30, 2010, pp. 1-79.

Mozerov, M. et al. "Trinocular Stereo Matching with Composite Disparity Space Image" 2009 16th IEEE International Conference on Image Processing, Nov. 7-20, 2009, pp. 2089-2092.

Niquin, C. et al. "An Occlusion Approach with Consistency Constraint for Multiscopic Depth Extraction" International Journal of Digital Multimedia Broadcasting, vol. 2010, 8 pages.

Peng, Q. "Fast Stereo Matching for High Resolution Stereo Image and Occlusion Handling" Sep. 2012, Journal of Convergence Information Technology, vol. 7, No. 16, pp. 27-35.

Reddy, V. et al. "A Fast Method for Global Depth-Map Extraction from Natural Images" Proceedings of the 9th European Conference on Visual Media Production, 2012, pp. 59-65—Abstract Only.

Shah, M.M. "Occlusion in Augmented Reality" 8th International Conference on Information Science and Digital Content Technology, vol. 2, Jun. 26-28, 2012.

Wang, L. et al. "Stereoscopic Inpainting: Joint Color and Depth Completion from Stereo Images" IEEE Conference on Computer Vision and Pattern Recognition, Jun. 23-28, 2009, pp. 1-8.

* cited by examiner

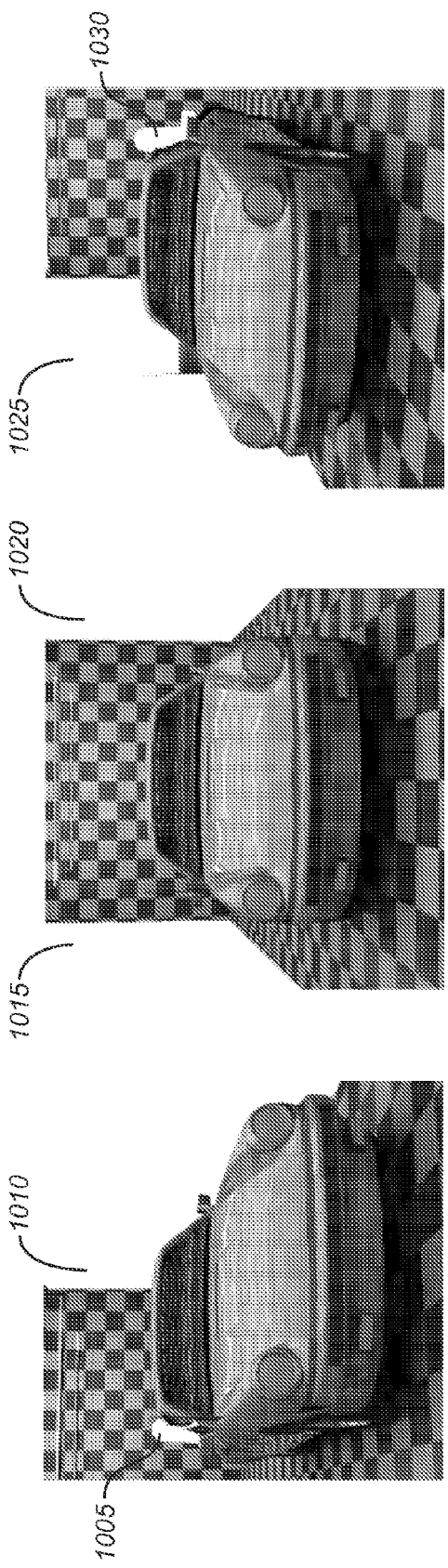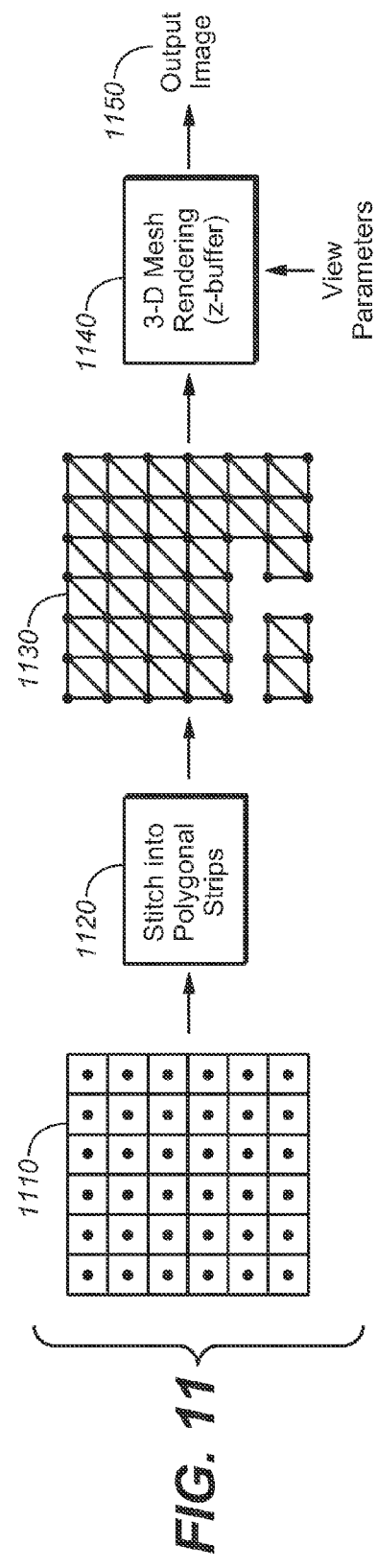

REPRESENTATION AND CODING OF MULTI-VIEW IMAGES USING TAPESTRY ENCODING

CROSS-REFERENCE TO RELATED APPLICATIONS

This application claims priority to U.S. Provisional Patent Application No. 61/541,050 filed 29 Sep. 2011, hereby incorporated by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The disclosure relates generally to image and video processing. More specifically, it relates to the representation and coding of multi-view images using tapestry encoding.

BACKGROUND OF THE INVENTION

Recently, there has been considerable interest towards creation and delivery of 3-D content. Encoding and decoding systems for TV and media formats suitable for 3-D features have been and are being developed. Exemplary imaging applications of such media formats can be found in stereoscopic and autostereoscopic displays, applications which involve processing and transmitting of information pertaining to a scene as viewed from multiple viewpoints. An image captured by viewing the scene from a viewpoint can be referred to as a view.

Information of the scene that is occluded by one view may be revealed by one or more other views. Various captured views of the scene can be utilized in predicting views not directly captured. Although the various views can be provided (e.g., for processing and coding) in their entirety for imaging and video applications, an increase in number of views to be processed and transmitted by a coding system is generally associated with an increase in number of bits and higher computational complexity involved in creation and delivery of 3-D content. Therefore, the creation and delivery of 3-D content takes into consideration what information (e.g., number of views as well as what information within each view) to provide to a coding system.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIGS. 10A-10C show three exemplary renderings produced from the tapestry shown in FIGS. 8 and 9A-9C. Specifically, left, center, and right views are shown in FIGS. 10A-10C, respectively.

FIG. 11 provides an exemplary method for 3-D mesh rendering that can be utilized to generate 3-D meshes from image information.

FIGS. 13A-13C show a left view, a central view, and a right view, respectively.

DESCRIPTION OF EXAMPLE EMBODIMENTS

Figure 1:
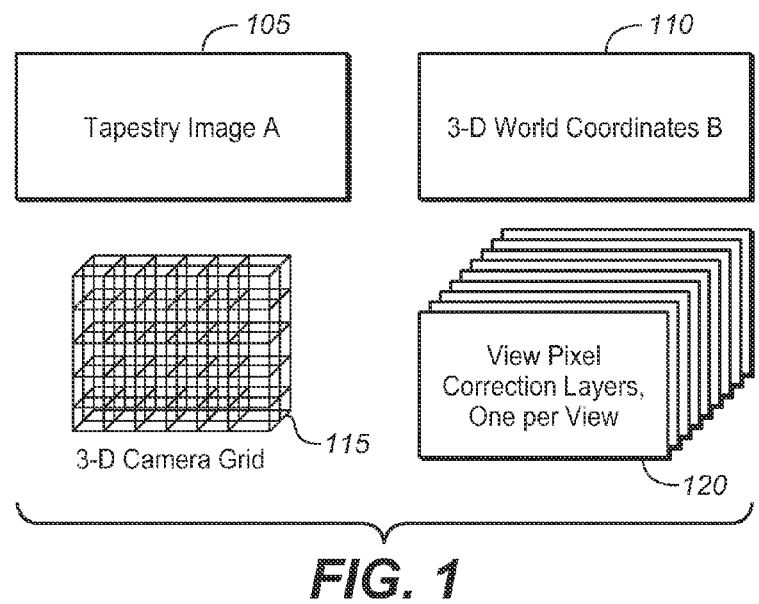
FIG. 1 shows a tapestry information format, in accordance with many embodiments of the present disclosure, contained in each frame of a video.

According to a first aspect of the disclosure, a computer-readable storage medium having stored thereon tapestry information associated with a scene is provided, wherein the tapestry information is suitable for deriving one or more desired views of the scene, the tapestry information comprising: a computer-readable storage medium having stored thereon tapestry information associated with a scene, wherein the tapestry information is suitable for deriving one or more desired views of the scene, the tapestry information comprising: a tapestry image, wherein the tapestry image comprises a plurality of pixels comprising information from a plurality of views associated with the scene; and a coordinates map comprising position data associated with the pixels of the tapestry image.

According to a second aspect of the disclosure, a method for generating at least one view of a scene from a tapestry image is provided, each of the at least one view being associated with one desired viewpoint of the scene, the method comprising: providing the tapestry image; providing a coordinates map associated with the tapestry image; deriving one or more views of the scene based on the tapestry image and the coordinates map, and generating the at least one view of the scene based on the one or more derived views.

According to a third aspect of the disclosure, an encoding system adapted to receive one or more input views of a scene is provided, the encoding system comprising: a tapestry generator adapted to generate a tapestry image and a coordinates map based on the one or more input views; and an encoder adapted to encode the tapestry image and the coordinates map into a bitstream.

According to a fourth aspect of the disclosure, a method for encoding information associated with one or more input views of a scene is provided, the method comprising: generating a tapestry image and a coordinates map based on the one or more input views; and encoding the tapestry image and the coordinates map into a bitstream.

According to a fifth aspect of the disclosure, a decoding system adapted to receive a bitstream associated with a scene and generate one or more output images is provided, the decoding system comprising: a decoder adapted to decode a tapestry image and a coordinates map from the bitstream, wherein the tapestry image and the coordinates map are associated with one or more input views of the scene; and a view generation unit adapted to derive the one or more output images of the scene based on the tapestry image and the coordinates map.

According to a sixth aspect of the disclosure, a method for decoding information associated with one or more input views of a scene is provided, comprising: decoding a tapestry image and a coordinates map from a bitstream, wherein the tapestry image and the coordinates map are associated with one or more input views of the scene; and deriving the one or more input views of the scene based on the tapestry image and the coordinates map.

The details of one or more embodiments of the disclosure are set forth in the accompanying drawings and the description below. Other features, objects, and advantages will be apparent from the description and drawings, and from the claims.

INTRODUCTION

According to many embodiments of the present disclosure, systems and methods for coding image/video data that lies somewhere between a 2-D and a full 3-D representation are described. Using hardware, the systems and methods for coding image/video data described herein permit accurate rendering of arbitrary views within a specified volume, which can be utilized in binocular stereoscopic and autostereoscopic displays, among other applications.

At a lower limit of the aforementioned systems and methods, a single view can be represented as in a standard video stream. At an upper limit, all visible surfaces in a 3-D environment/scene can be coded with full angular color data, representing geometry and specularity from an interpolated set of views within an arbitrary volume. Some modern graphics hardware can, for instance, be efficiently leveraged to render the environment/scene from any allowed viewpoint.

As used in this disclosure, the term "coding" refers to both encoding and decoding. Similarly, the phrase "coding system" encompasses either or both of an encoding system and a decoding system.

As used in this disclosure, the terms "environment", "scene", and "world" can be used interchangeably.

As used in this disclosure, the terms "viewpoint" and "perspective" can be used interchangeably and are defined herein as a position, angle, and/or direction from which to view a scene. The terms "view", "viewpoint image", and "perspective image" can be used interchangeably and are defined herein as a portion of the scene seen/captured from a particular viewpoint.

As used in this disclosure, the term "view frustum" or "viewing frustum" is defined herein as a volume of space in a scene that can be seen/captured from a particular viewpoint. For instance, the region of space can include image information seen/captured within a rectangular pyramid or circular cone originating from the particular viewpoint.

As used in this disclosure, the term "quality" refers to both objective image/video quality and subjective image/video quality. Objective image/video quality generally can be quantified. Examples of measures of (objective) image/video quality include distortion between an expected image and a predicted image, signal-to-noise ratio (SNR) of an image signal, peak signal-to-noise ratio (PSNR) of an image signal, and so forth.

Subjective image/video quality refers to the quality of the image as seen by a viewer of the image/video. Although subjective image/video quality can also be measured using objective measures of image/video quality, an increase in objective image/video quality does not necessarily yield an increase in subjective image/video quality, and vice versa. In relation to images processed using block-based operations, for instance, subjective image/video quality considerations can involve determining how to process pixels along block boundaries such that perception of block artifacts are reduced in a final displayed image. To an observer of an image, subjective quality measurements are made based on evaluating features such as, but not limited to, smoothness, sharpness, details, and temporal continuity of various features in the image.

As used in this disclosure, an allowed viewpoint refers to a viewpoint from which information can be directly extracted from information available to the coding systems and methods and/or rendered/derived from the information available to the coding systems and methods. Similarly, an allowed view frustum refers to regions of space in a scene that can be seen, with constraints from the available information associated with the scene.

Embodiments provided in the present disclosure can be used in an encoding and decoding system for TV and media formats suitable for 3-D features, where information from new views can be utilized in revealing areas of a scene that were previously occluded.

An exemplary application of such formats is in autostereoscopic displays, where many images are displayed. For instance, different regions of the image can be viewed depending on viewer position. Another exemplary application is in free-viewpoint TV technology, where a viewer can control viewpoints that are delivered for display. Other exemplary applications include use in augmented reality, where informational graphics are inserted onto 2-D images of 3-D scenes (like road information, shopping information, Facebook contacts, and history information). The 2-D images of the 3-D scene can be transmitted in a format where the viewpoint can change (such as viewpoint changes based on a viewer's location in the 3-D scene).

These exemplary imaging applications can contain information that is occluded in some views and revealed (disoccluded) in other views. The disoccluded information can be quite substantial in these applications. One approach is to send views associated with each viewpoint. However, number of views, and thus number of bits to be sent for processing and coding by a coding system, can escalate. For example, an autostereoscopic display can utilize information anywhere from two viewpoints; to nine viewpoints (which is typical); to over thirty-two viewpoints. Free-viewpoint applications can have multiple horizontal views and, in some versions, multiple vertical views. Augmented reality applications can have horizontal, vertical, and zoom-related viewpoints. Consequently, coding of one view for each viewpoint to be displayed can involve a large number of bits and high computational complexity.

The present disclosure addresses occluded regions by transmitting an image that encompasses many views within a frustum, so that the transmitted image is like a tapestry originally wrapped around the scene objects that can then be unfolded for coding and transmission.

Basic Frame Encoding

FIG. 1 shows an information format, in accordance with many embodiments of the present disclosure, contained in each frame of a video. In this disclosure, the information format is referred to by the term "tapestry" or "tapestry information" (see reference [4], herein incorporated by reference in its entirety). As shown in FIG. 1, tapestry information comprises information represented in a tapestry image A (105) and 3-D world coordinates array B (110). The tapestry information can also comprise a 3-D camera grid (115) and correction layers (120), where the 3-D camera grid (115) and the correction layers (120) are associated with the tapestry image A (105) and the 3-D world coordinates array B (110). This tapestry information may be derived, for instance, from an MPEG-style differential frame encoding and compression scheme.

The tapestry image A (105) is generally a 2-D array of pixel data, which can be represented as a 2-D image (e.g., rectangular image) that can be encoded using conventional 2-D compression schemes. The pixel data may contain high dynamic range information (see reference [3], incorporated herein by reference in its entirety). The tapestry image A (105) may or may not appear as a traditional perspective image. For instance, features shown in the tapestry image A (105) may look warped or distorted, as will be shown later in the present disclosure (e.g., FIG. 8).

The 3-D world coordinates array B (110) contains position data associated with the pixels in tapestry image A (105). In one embodiment the 3-D world coordinates array B (110) may record only one parameter (e.g., depth), while in other embodiments it may record two parameters (e.g., depth plus horizontal offset or disparity) or three parameters (e.g., depth, horizontal disparity, and vertical disparity).

The term "disparity" as utilized in relation to the 3-D world coordinates array B (110) indicates how much a particular pixel in the tapestry image A (105) has moved from where it would have been in a set default view. Such a default view can be, for instance, provided as input (e.g., manual input), selected from one or more input views, or determined automatically as an average or weighted average of a plurality of input views. Consequently, this use of the term "disparity" provides a measure of local image warp at the particular pixel, where image warp will be shown later in the disclosure (e.g., FIG. 8). In a case of a view that has only horizontal stretching/shrinking, the 3-D world coordinates array B (110) can be collapsed to a 2-D world coordinates array containing information on depth and horizontal disparity. A similar case exists for a view that has only vertical stretching/shrinking.

In yet another embodiment, the 3-D world coordinates array B (110) may contain the 3-D world coordinates (e.g., x, y, and z) corresponding to each pixel in the tapestry image A (105). Embodiments may involve conversion of 3-D world coordinates position data into equivalent depth plus disparity data (e.g., horizontal and vertical disparity), and vice versa.

While the tapestry image A (105), which comprises visual information such as color and intensity information, can be encoded using conventional 2-D compression schemes, the 3-D world coordinates array B (110) may not be amenable to conventional 2-D compression schemes. For compression of each of the tapestry image A (105) and the 3-D world coordinates array B (110), lossless compression and, optionally, lossy compression can be utilized to reduce image size. However, for compression purposes, errors that should be accounted for (e.g., errors that can or cannot be tolerated) in visual information are generally different from errors that should be accounted for in coordinate information. Consequently, the 3-D world coordinates array B (110) is generally processed differently from the tapestry image A (105).

Information from the tapestry image A (105) can be used to render specific views and, from information in these rendered views, remove some or all of the aforementioned warped/distorted aspects that may be present in the tapestry image A (105) by projecting from a 2.5-D scene frame to a view frustum.

An exemplary method for such a projection is shown in reference [4]. For instance, pixels can be joined into a triangle mesh using color values contained in each pixel of the tapestry image A (105) and the 3-D vertices of the 3-D world coordinates array B (110). Homogeneous coordinates (or similar projective geometry systems) can be utilized to represent coordinates of points, including points at infinity, using finite coordinates. Graphics hardware can then be used to reproject resulting triangle meshes onto an image from a user-defined view, within specified limits. These limits are generally set by the 3-D camera grid (115), which provides allowed view frusta.

Alternatively, point cloud rendering techniques may be used to render the pixels in the tapestry image A (105) directly (see reference [1], incorporated herein by reference in its entirety).

In general, a tapestry may not be rendered using information from completely arbitrary views contained in the tapestry image A (105). One reason is that an entire scene usually cannot be represented in a single image (e.g., by a single view) at a reasonable resolution. Consequently, views for which information is to be recorded can be selected to lie within a convex hull defined by the 3-D camera grid (115) of allowed view frusta. Specifically, these are the allowed (legal) viewpoints, generally set depending on a particular application, that can be coded and utilized in the generation of the tapestry image A (105). As an example, stereoscopic systems generally allow at least two viewpoints (and two view frusta associated with these viewpoints). Viewpoints in between and nearby to these two viewpoints are also generally allowed.

Each point in the 3-D camera grid (115) provides a 3-D indexing scheme for holding information on recorded views and contains, for instance, a view position, view angle, view direction, orientation (direction and up vector), horizontal and vertical size of each view, and so forth. In other words, each point on the 3-D camera grid (115) corresponds to a particular viewpoint and its associated frustum. Consequently, the 3-D camera grid (115) provides a manner/mechanism to specify a viewpoint and its associated view frustum, and a particular view can be taken from the viewpoint and associated view frustum identified by a particular point on the 3-D camera grid (115). The 3-D camera grid (115) can be organized, for instance, where information on each point is contained within an element of a one-dimensional or multi-dimensional array.

The 3-D camera grid (115) is typically associated with optional view pixel correction layers (120), to be described later in the present disclosure. In cases where view pixel correction layers (120) are not generated by an encoder and/or not provided by an encoder to a decoder, the 3-D camera grid (115) may still be provided by the encoder and applied to constrain view movement during the decoding of the tapestry image A (105). Without data from the 3-D camera grid (115), a decoder may not recognize what view frusta are "out of bounds", thus creating views with incomplete data.

In a case where only one view is recorded (e.g., the 3-D camera grid (115) has grid dimensions of 1×1×1), then only one view may be rendered. The 3-D world coordinates array B (110) generally need not be utilized for this case since coding collapses to that of coding a 2-D video stream associated with the single view.

In cases where multiple views are selected to be rendered and thus information from multiple views are recorded, errors are generally present in renderings produced by reprojection of pixels in the tapestry image A (105) from a combination of the selected views.

By way of example, these errors may arise from non-Lambertian reflectance, multiple disocclusions, and image warping arising from the reprojection. To correct these errors, an encoder may provide a correction layer (120) for each recorded view frustum so that a decoder associated with the encoder can interpolate and correct predicted views and/or nearby views. These corrections are optional and may be thresholded or elided based on specifications of an application under consideration (such as bitrate budgets or computation complexity constraints).

By way of example, the correction layer (120) can provide a difference between a rendering of a particular view generated from the tapestry (105, 110) and a corresponding image captured for the particular viewpoint. Each point on the 3-D camera grid (115) can thus be associated with a correction layer (120), where the correction layer (120) can be sent for coding along with a corresponding tapestry-generated view. The correction layer (120) can be compressed to improve efficiency of transmission or remain uncompressed, and such coding (e.g., compression) of the correction layer (120) is generally independent of how the tapestry (105, 110) itself is generated and defined.

Binocular Stereo

Figure 2:
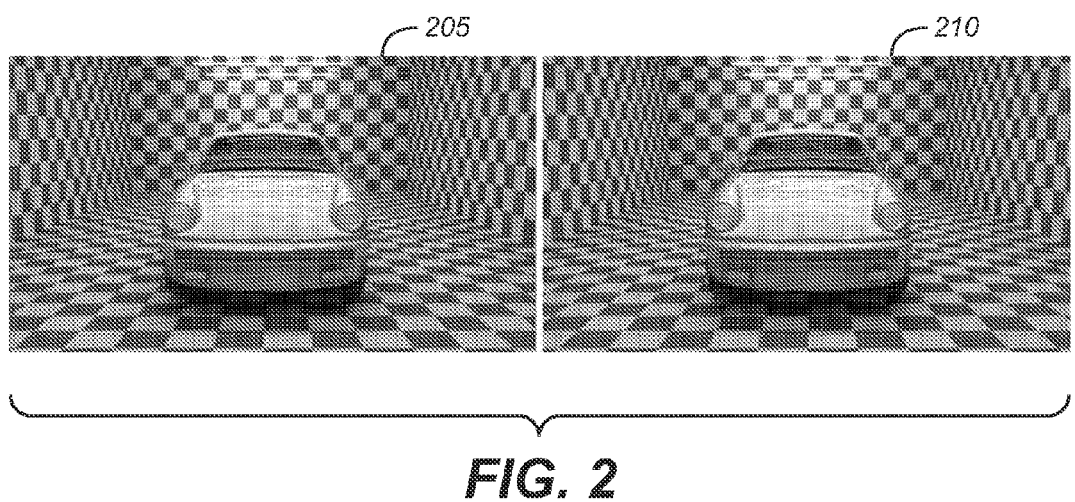
FIG. 2 shows an exemplary stereo pair comprising a left view and a right view.

FIG. 2 shows an exemplary stereo pair comprising a left view (205) and a right view (210).

Consider that the right view (210) is provided as a tapestry image A (105 in FIG. 1). In a single perspective image, such as the right view (210), three-dimensional scene positions can be encoded as a depth map (z-coordinates) with an appropriate camera transform to derive the other two coordinates (x- and y-coordinates). Specifically, depth values and camera parameters can be utilized in deriving the x- and y-coordinates.

Figure 3:
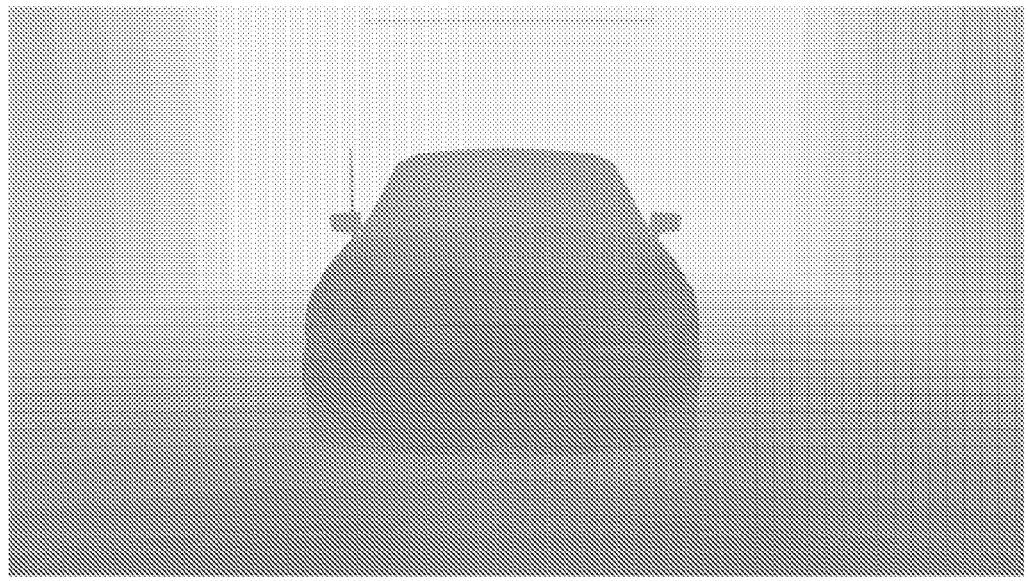
FIG. 3 shows depth information of a depth map mapped in accordance with brightness.

FIG. 3 shows depth information of the depth map mapped in accordance with brightness. Specifically, features that are closer to an origin of a viewpoint of the right view (210) appear darker than features farther from the origin. Such depth maps can be obtained through rendering tools and/or derived from a captured stereo pair using disparity conversion methods. An exemplary reference that introduces disparity methods for stereoscopic images and video is provided in reference [5], which is incorporated herein by reference in its entirety.

The depth map can be considered an implicit representation of pixel motion and can provide information on how pixels shift from one view to another by position reprojection. If camera parameters are known, pixel motion between views can be calculated. Specifically, pixel motion refers to a change in position of a particular pixel due to a change in viewpoint. In the case of stereoscopic video content, pixel motion can be calculated between the left and right views as well as between frames of the video content.

As evident from observation of the right view (210) as shown in FIG. 2 and the depth map as shown in FIG. 3, depth information is generally consistent throughout the right view (210) except for a few sharp boundaries. Consequently, due to the generally consistent depth information, compression schemes can be utilized such that the right view (210) can be compressed to a file size smaller than its original file size.

Figure 4:
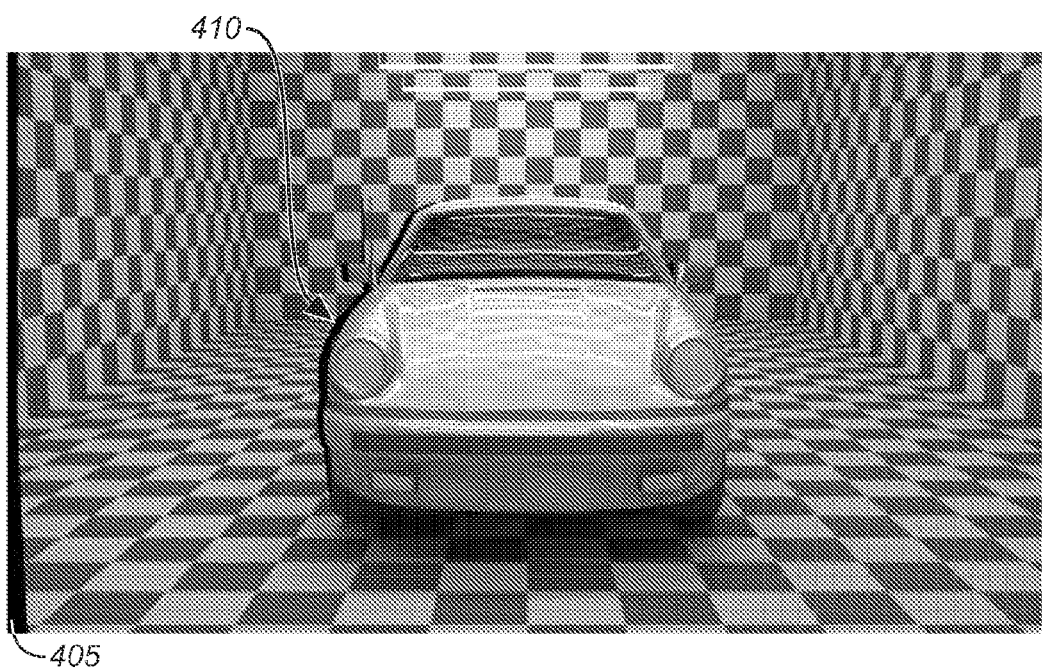
FIG. 4 shows a left view derived by combining information from the right view shown in FIG. 2 and the depth map shown in FIG. 3 of the right view.

FIG. 4 shows a left view derived by combining information from the depth map, shown in FIG. 3, of the right view (210 in FIG. 2), together with the right view (210 in FIG. 2) (used as the tapestry image) itself. As seen in FIG. 4, a few regions (such as regions 405 and 410) of the derived left view are missing. Consequently, the derived left view shown in FIG. 4 is an estimation of the left view (205) of FIG. 2 with portions of the scene missing due to the change in viewpoint from the right view (210) of FIG. 2.

A correction layer derived from information on the various images/maps provided in FIGS. 2-4 can provide correction for occlusions and specular highlights that move as a result of using the right view (210 in FIG. 2) and its associated depth map (shown in FIG. 3) to generate a left view. In general, movement of specular highlights can result from using information from one view to generate information associated with another view.

It should be noted that although sending of correction layers is in accordance with many embodiments of the present disclosure, other methods may be utilized alternatively or in conjunction with the sending of correction layers. For instance, methods such as textured area filling/inpainting can be used when bit budget does not allow for sending of correction layers. Textured area filling/inpainting involves prediction of image properties (e.g., texture, color, etc.) at a particular location of an image based on available image properties at locations neighboring the particular location. An exemplary reference that introduces a method for depth-based texture filling is provided in reference [6] (which is incorporated herein by reference in its entirety) where depth-based information is utilized in prediction of disoccluded regions of a synthesized view. Textured area filling/inpainting as well as other methods can be utilized alternatively or in conjunction with the sending of correction layers.

In the present example (as well as in general), cost of providing the depth map (e.g., number of bits in the transmission of the depth map) to the coding system is generally at least partially compensated by improved prediction of the left view. Additionally, it should be noted that information from the depth map can allow, by way of example and not of limitation, placement of closed captions into an image at an appropriate depth, dynamic matting of virtual characters, and so on.

Autostereo

Autostereoscopic displays utilize multiple views as input. An exemplary number of views can be a dozen or more views to show stereo and parallax without necessarily using special glasses. Utilizing a method similar to that previously described for stereo coding, one tapestry image for a particular view and a depth map associated with the tapestry image can be provided to a coding system to derive one or more views towards the left and right of the particular view. The particular view can be, for example, a central view.

Consider that the tapestry image is for a central view centered on a front side of a car and that a view to be determined is a far-left view. Specifically, in this example, the central view is utilized to derive the far-left view.

Figure 5A:
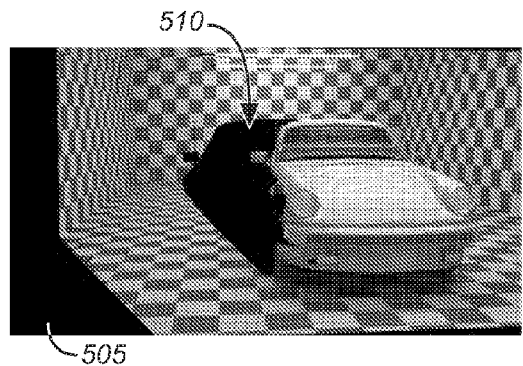
FIGS. 5A and 5B show a derived far-left view and one possible correction layer associated with the derived far-left view, respectively.
Figure 5B:
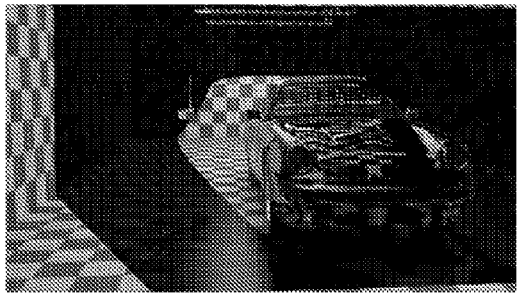

FIGS. 5A and 5B show a derived far-left view and one possible correction layer associated with the derived far-left view, respectively. The derived far-left view shows parts of the car that cannot be seen by the central view. However, it should be noted that the derived far-left view shows larger errors (such as areas 505 and 510) than errors (405, 410) shown for the derived left view of FIG. 4. A reason is that the derived left view of FIG. 4 is associated with a left view closer to the central view than the left view associated with the derived far-left view of FIG. 5A. In general, errors associated with views derived for more divergent viewpoints, relative to a set central viewpoint, are larger than views derived for viewpoints that are closer to the set central viewpoint.

Although the correction layer shown in FIG. 5B can be provided to a decoder for repairing these areas (such as 505 and 510 in FIG. 5A), transmission of the correction layer requires bits and bandwidth. Additionally, in many applications, multiple views need to be derived, and thus multiple correction layers are generally needed to cover these views using a reasonable number of bits and reasonable amount of bandwidth.

It should be noted that a particular view can be derived from interpolation of derived views using prediction methods such as motion estimation (e.g., pixel motion of a particular pixel between different views). It should also be noted that correction layers themselves can be predicted through interpolation by performing prediction methods based on generated correction layers.

Figure 6:
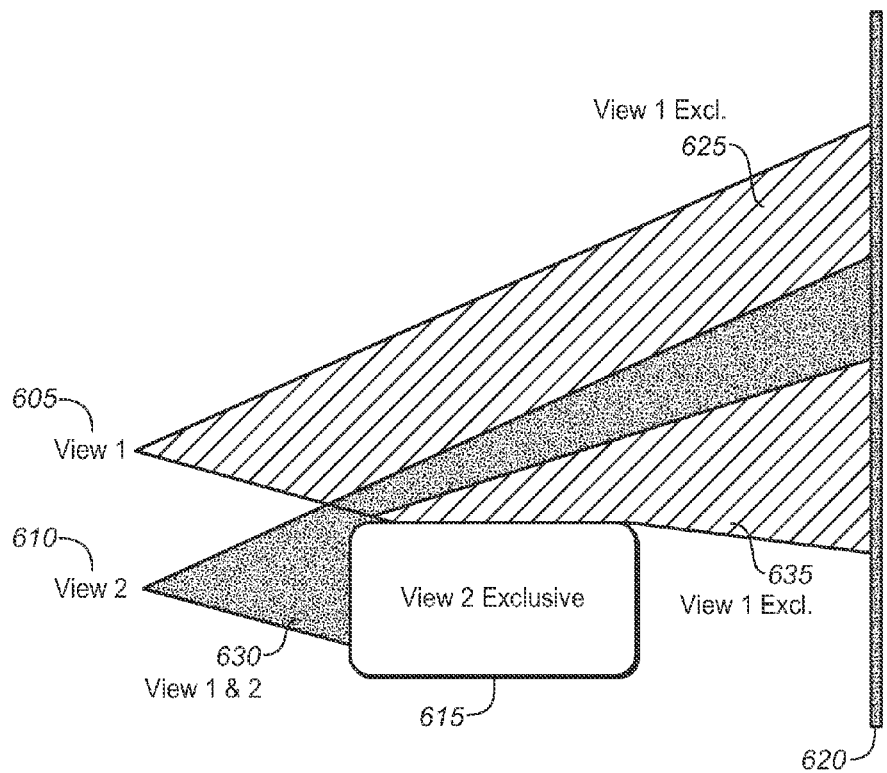
FIG. 6 shows an example of a top view of view frusta corresponding to two viewpoints.

As previously mentioned, a tapestry can capture information from a 3-D scene (either real world or artificial) and map the information into useful bits from which images can be extracted and/or derived. FIG. 6 shows an example of a top view of view frusta corresponding to two views, view 1 (605) and view 2 (610). Specifically, FIG. 6 shows a cross section of two view frusta. The two views (605, 610) can be, for instance, a left view (e.g., from a left eye) and a right view (e.g., from a right eye), although the two views can be any two arbitrary views. The scene in FIG. 6 includes an object (615) and a wall (620), where the wall (620) can be considered a background of the scene.

A side of the object (615) can be seen only in view 1 (605), whereas other aspects of the object (615) (e.g., front side of the object (615)) can be seen only from view 2 (610). There are areas of the wall (625, 635) exclusive to view 1 (605), areas along the object (615) exclusive to view 2 (610), and areas (630) that can be seen from both views (605, 610).

In forming the tapestry based on both views (605, 610), redundant information (such as that in region 630) can be minimized whereas areas/objects exclusive to each view (e.g., 625, 635 for view 1 and 615 for view 2) can be captured by the tapestry. Combining of information from both views (605, 610) can form a combined image containing a warped scene (as shown later in FIG. 7D).

Figure 7A:
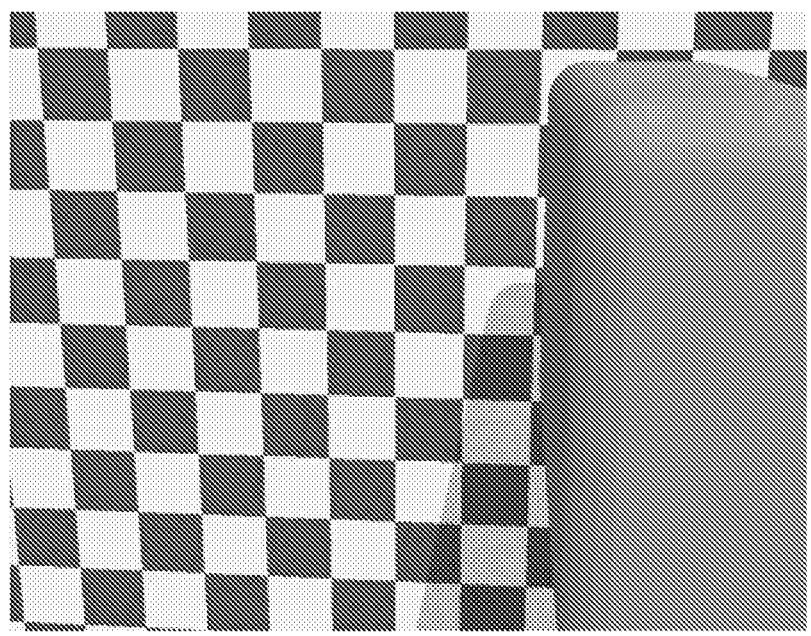
FIGS. 7A and 7B show views of a scene obtained from a first viewpoint and a second viewpoint.
Figure 7B:
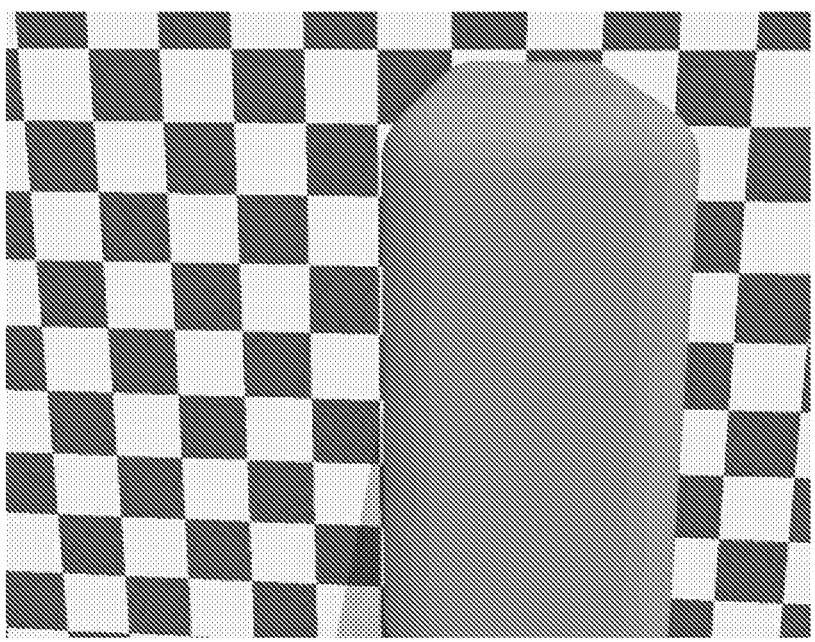
Figure 7C:
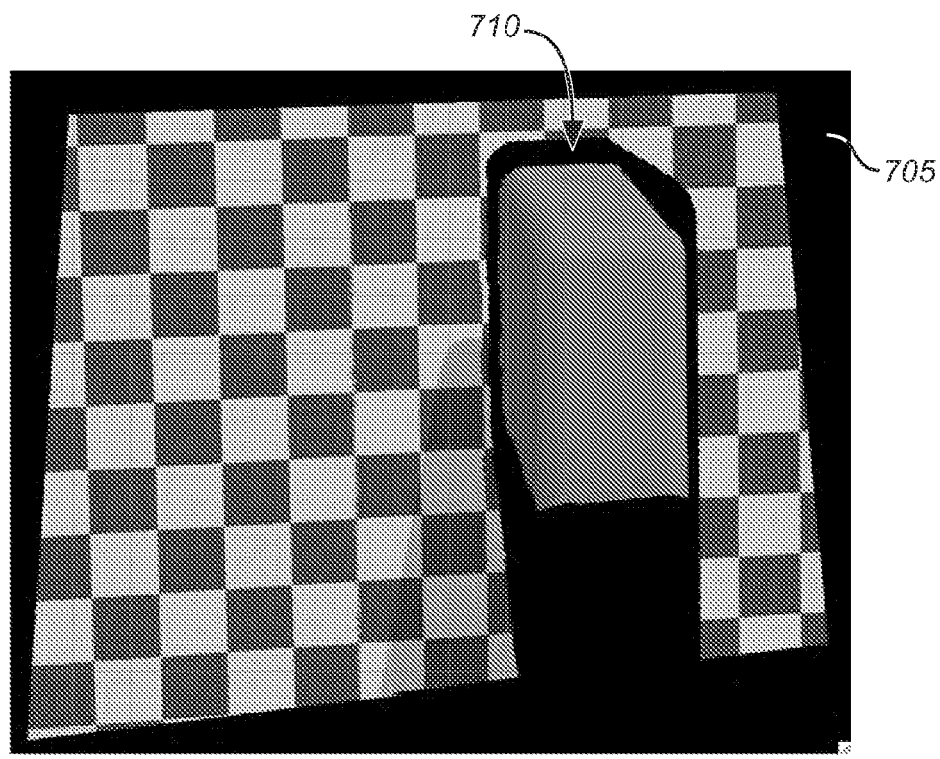
FIG. 7C shows a perspective image comprising information from both the first and second views of FIGS. 7A and 7B, respectively.

FIGS. 7A and 7B show views of a scene obtained from a first viewpoint and a second viewpoint. The scene comprises a checkerboard background and a parallelepiped. FIG. 7C shows a perspective image comprising information from both the first and second views of FIGS. 7A and 7B, respectively. Black areas (705, 710) in FIG. 7C are associated with areas of the scene that cannot be seen from either of the two source views in FIGS. 7A and 7B.

It should be noted that the black areas (705, 710) show that the parallelepiped has been determined to be located some distance away from the checkerboard background and that a renderer has identified the parallelepiped and the checkerboard background as being disjoint geometries due to the distance. In such a case, the distance may be above a set threshold, which results in the checkerboard background and the parallelepiped being rendered disjointly from each other. Thresholds and disjoint geometries will be further described later in the present disclosure.

Figure 7D:
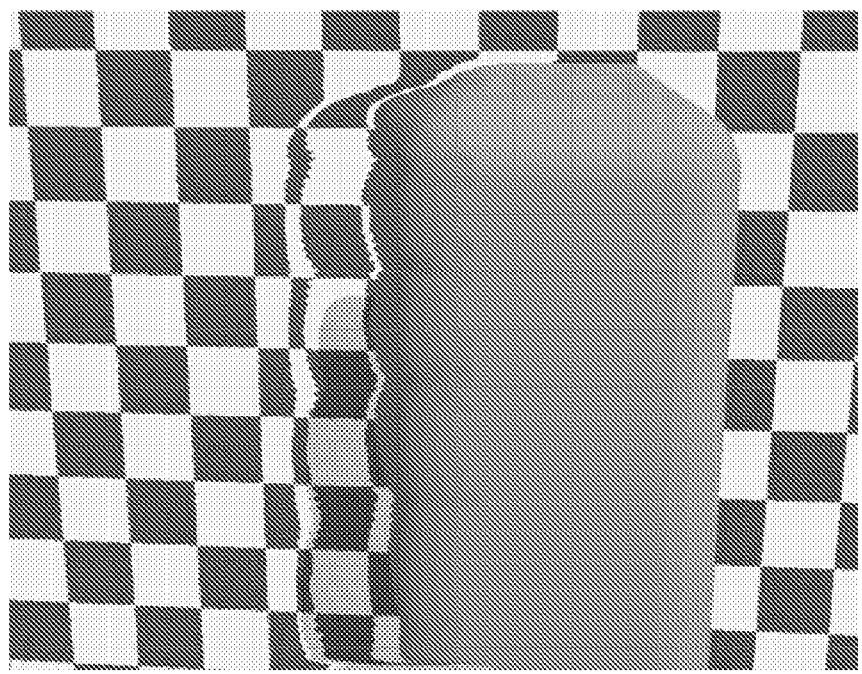
FIG. 7D shows one possible tapestry image that can be generated from the first and second views of FIGS. 7A and 7B, collectively.

FIG. 7D shows one possible tapestry image that can be generated from the first and second views of FIGS. 7A and 7B, collectively. Specifically, FIG. 7D shows a combining of information from both the first and second views, and thus the first and second views can be derived from the image of FIG. 7D. The tapestry image of FIG. 7D can also be utilized to generate other perspective images aside from the first and second views, one example of which is shown in FIG. 7C.

Figure 8:
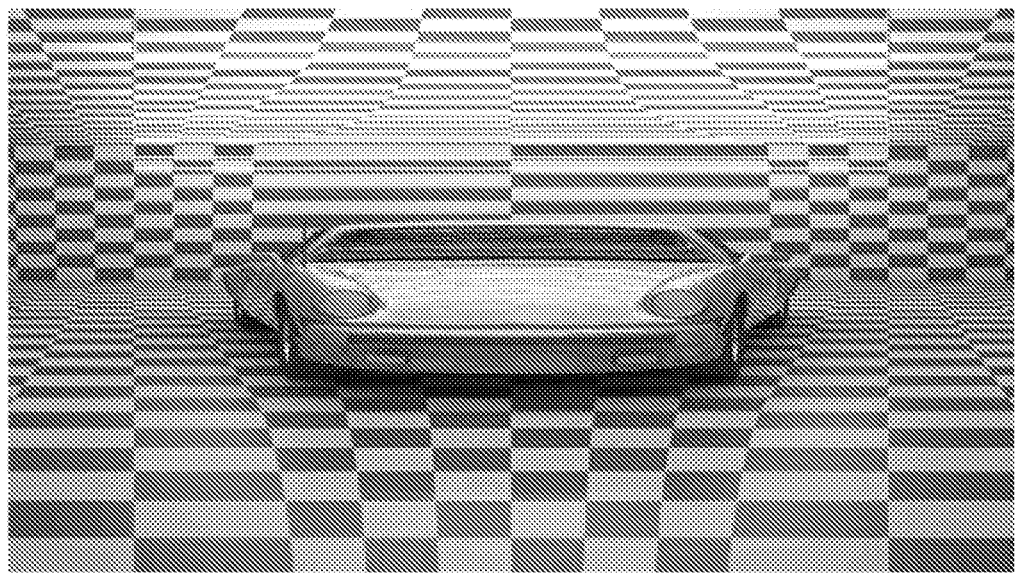
FIG. 8 shows a multi-perspective image comprising information suitable for generating views associated with viewpoints not necessarily contained in the multi-perspective image.

As another example, FIG. 8 shows an image comprising information from multiple perspectives; the image can thus be referred to as a multi-perspective image. The information is suitable for generating views associated with viewpoints contained in the multi-perspective image as well as views not necessarily contained in the multi-perspective image. Reference [2], incorporated herein by reference in its entirety, is an exemplary reference concerning multi-perspective images such as that shown in FIG. 8. The multi-perspective image of FIG. 8 will be utilized as the tapestry image in the following discussion.

The tapestry image can be generated with consideration to minimizing redundant information between from the various viewpoints utilized in generating the tapestry image. For example, a view associated with a viewpoint 1° away from the central viewpoint is generally similar to the central viewpoint and also similar to another view associated with a viewpoint 2° away from the central viewpoint. Consequently, redundant information from these three viewpoints can be minimized when generating the tapestry image.

This tapestry image appears strange to the eyes. However, some observations can be made concerning this particular tapestry image. First, the tapestry image can be created to allocate more image area on the car, which is generally the point of attention, and less on various other regions of the image, which can collectively be referred to as background. With more information on the car, a sharper derivation/rendering of the foreground for each output view can be obtained. Second, a linear sweep of the tapestry image covers many angles and views that may be involved in an autostereo display, thus showing parts of the car that may be lost in any single perspective image. As previously mentioned, each pixel in a tapestry image can be associated with a particular view or views from which that particular pixel is obtained or derived.

Allocation of importance to features of an image/video can be performed manually (e.g., user selection of important features of video content) or determined automatically. Frequency analysis such as that generally performed during image compression can be utilized. For instance, the tapestry image may utilize a frequency analysis guided warping, where a larger area in the tapestry image is allocated for high frequency information. Determination of importance may also be based on evaluating saliency of different features in the video content. Direct/manual warping of the tapestry image may be performed alternatively or in conjunction with, for instance, frequency or saliency guided warping.

Figure 9A:
FIGS. 9A-9C show scene coordinates corresponding to the multi-perspective view shown in FIG. 8.
Figure 9B:
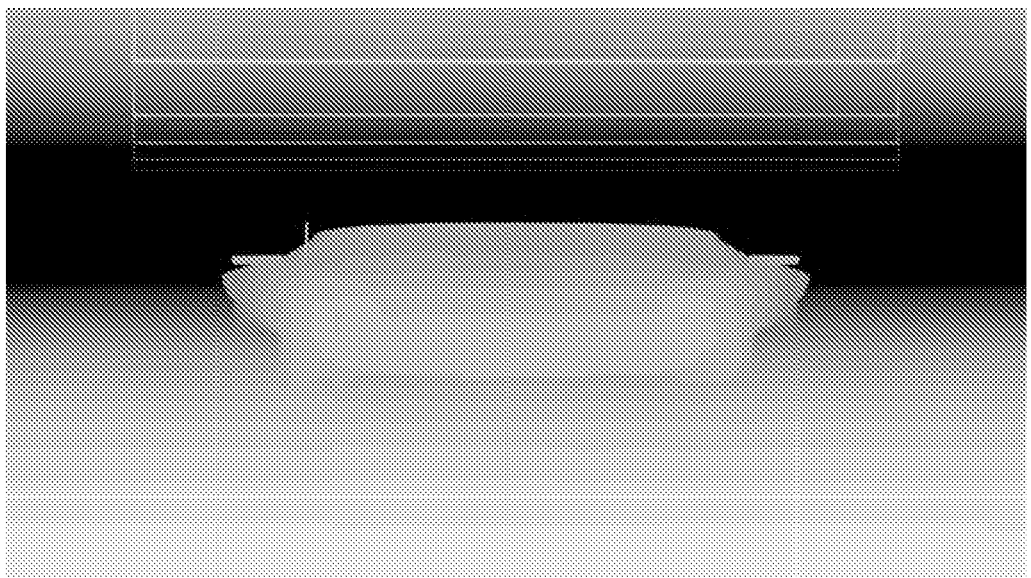
Figure 9C:
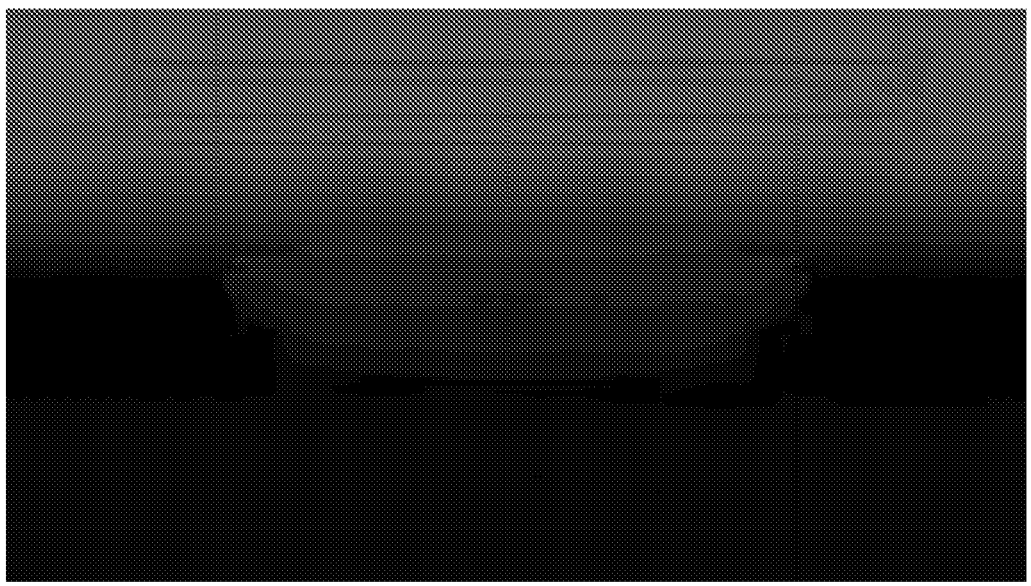

FIGS. 9A-9C show 3-D world coordinates corresponding to the multi-perspective image shown in FIG. 8. The 3-D world coordinates can be used to reproject pixels from the tapestry image shown in FIG. 8 to derive an estimate of any view in between that may be needed in a given application. There may be no need to transmit more than the tapestry image and the 3-D world coordinates array to generate as many views as a particular autostereo system requires.

As previously stated, the tapestry image shown in FIG. 8 is not a single perspective image. Specifically, image perspective (e.g., viewpoint) changes with pixel position in the tapestry image and thus 3-D world coordinates (e.g., x, y, z) have to be provided for each pixel position in order to associate each pixel in the tapestry image with an actual location in the scene. As a result, each pixel in a tapestry contains color (or intensity) information and 3-D coordinate information, where the color (or intensity) information can be stored in tapestry image A (105 in FIG. 1) and 3-D coordinate information can be stored in 3-D world coordinates array B (110 in FIG. 1), respectively.

FIGS. 9A-9C depict an example representation of 3-D coordinate information for each pixel in the tapestry image of FIG. 8. In this embodiment, x, y, and z coordinate information is first normalized to a range, e.g., [0, 1] or [0, 255], and then it is associated with an arbitrary color channel (e.g, R, G, or B). For example, a higher value in the blue channel can be associated with a higher z-coordinate value (relative to a set origin). As is well known, information in FIGS. 9A-9C (representing an example mapping to R, G, and B, respectively) can be combined into one image such that each pixel in the image is associated with an R, G, and B (e.g., x, y, and z) value. It should be noted that a mapping of each position coordinate to a color value is arbitrary and primarily for visualization purposes.

In embodiments where only horizontal or only vertical view motion is allowed, the 3-D world coordinates can be collapsed to 2-D world coordinates representing depth and either horizontal or vertical disparity for each pixel in the tapestry image.

In one embodiment, the 3-D world coordinates array may be encoded in the form of depth values with pixel position offsets. Relative to a current frame's view parameters, such coding permits the 3-D coordinate to be derived and can provide benefits in compression and support in decoding hardware. For low-cost decoding hardware, for instance, the pixel position offsets may be used with a depth buffer to determine which pixels to draw for a given frame without necessarily involving any perspective matrix calculations.

FIGS. 10A-10C show three exemplary renderings produced from the tapestry shown in FIGS. 8 and 9A-9C. Specifically, left, center, and right views are shown in FIGS. 10A-10C, respectively. As previously mentioned, multiple views can be generated from a single image. Few errors are associated with the car itself although some errors are present in the (generally less) important background (such as areas 1005 and 1010 in FIG. 10A, 1015 and 1020 in FIG. 10B, 1025 and 1030 in FIG. 10C). These errors can be corrected using one or more of texture filling/inpainting and correction layers. Alternatively or in combination, use of a wider tapestry image, where more of the background is captured, can reduce errors. Automated methods can be developed for this purpose.

Rendering a tapestry such as this can be accomplished by performing 3-D mesh rendering methods on the array of pixels and 3-D world coordinates as shown in FIG. 11. As is known by a person skilled in the art, FIG. 11 provides an exemplary method for 3-D mesh rendering that can be utilized to generate 3-D meshes from image information (e.g., 2-D image with its corresponding depth information). For instance, the array of pixels and the 3-D world coordinates can be combined into an array of Gouraud-shaded quads in the case that Gouraud-shaded rendering is utilized in 3-D mesh rendering.

With reference to FIG. 11, each pixel (1110) in a tapestry (e.g., tapestry and 3-D world coordinates) contains information on the 3-D coordinates (e.g., x, y, z) and color information (e.g., R, G, B) associated with the pixel. Each pixel is stitched into polygonal strips (1120) to form a 3-D mesh (1130). Although triangular strips are common, other polygons such as quadrilaterals may also be utilized. Gaps in the 3-D mesh (1130) can occur where large 3-D discontinuities (e.g., locations where information is insufficient or unavailable) exist. Additional 3-D rendering (1140) of the 3-D mesh (1130), such as but not limited to a Gouraud-shaded rendering (1140), can (but need not) be performed on the 3-D mesh (1130) to interpolate information in the 3-D mesh (1130) and thus smooth the polygons present in the 3-D mesh (1130). An output image (1150) can be formed from the 3-D mesh itself (1130) or from the 3-D mesh subsequent to rendering (1140).

Creating Tapestries

Since FIG. 8 deals with a virtual scene, FIG. 8 provides a case where information of a scene can be assumed to be complete. In a real world scene, to obtain information concerning a plurality of views, a camera with multiple perspectives arranged in a line, such as in free-viewpoint TV technologies, or similarly a line comprising a plurality of cameras (each capturing a particular perspective) can be employed. A tapestry image and estimated world coordinates can be generated from images captured from the camera or cameras. This is called multiple-view stereo, and computer vision algorithms exist for deriving scene positions from such captured images.

In addition to obtaining the tapestry image and estimated scene coordinates from the captured views, view pixel correction layers can be computed using the captured views as references. The correction layers imply a specific mapping from the tapestry image to each of the captured views. Thus, a 3-D camera grid associated with the tapestry image and estimated world coordinates becomes a single line of views corresponding to the captured views, which permit rendering of any view needed along a user-defined target parallax width. In general, base resolution of the tapestry is higher than resolution of a target view to be rendered. Correction layers can be applied to the derived target view such that the derived target view match more closely with those references corresponding to the same viewpoint.

As previously noted, methods such as, but not limited to, textured area filling/inpainting can be utilized in conjunction with or as an alternative to utilization of correction layers. For instance, in a case where a decoder receives insufficient information from the correction layers, insufficient number of correction layers, and/or when there are pixels in a particular view for which there is insufficient or no information, other image information may need to be utilized and/or derived. The information in one or more of the correction layers may be interpolated and/or otherwise derived based on methods such as textured area filling/ inpainting. In a case where no correction layers are provided to a decoder, these methods may be utilized as fallback methods to derive information for any desired view based on information provided to the decoder.

Figure 12A:
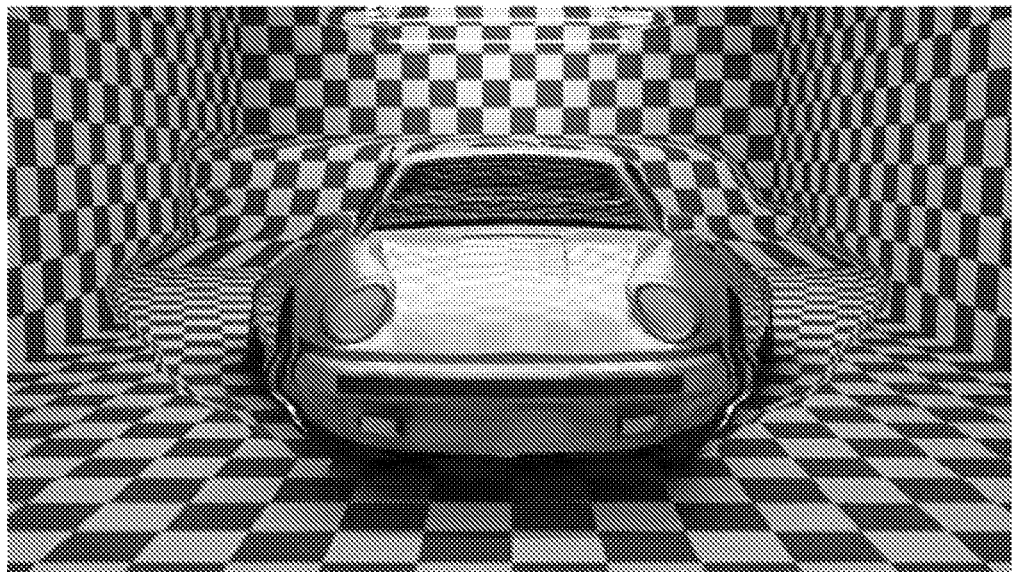
FIG. 12A shows a tapestry image generated from a combination of information from three views.
Figure 12B:
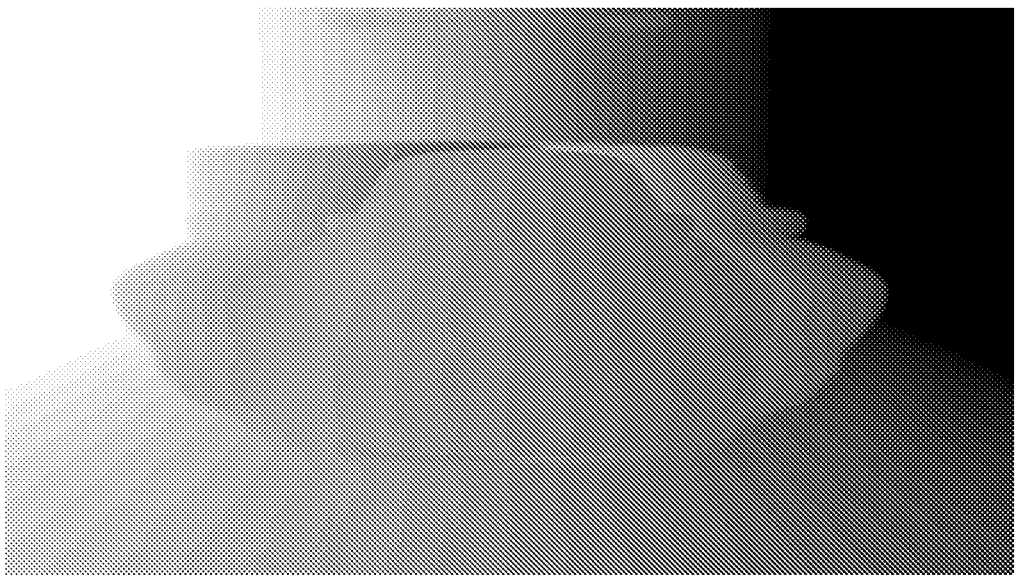
FIGS. 12B-12D collectively show a 3-D world coordinates map associated with the tapestry image of FIG. 12A.
Figure 12C:
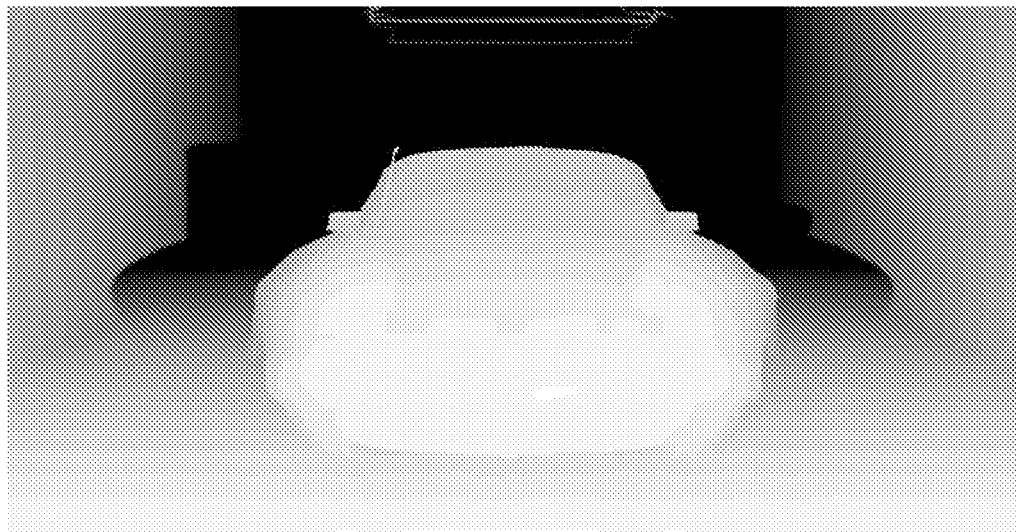
Figure 12D:
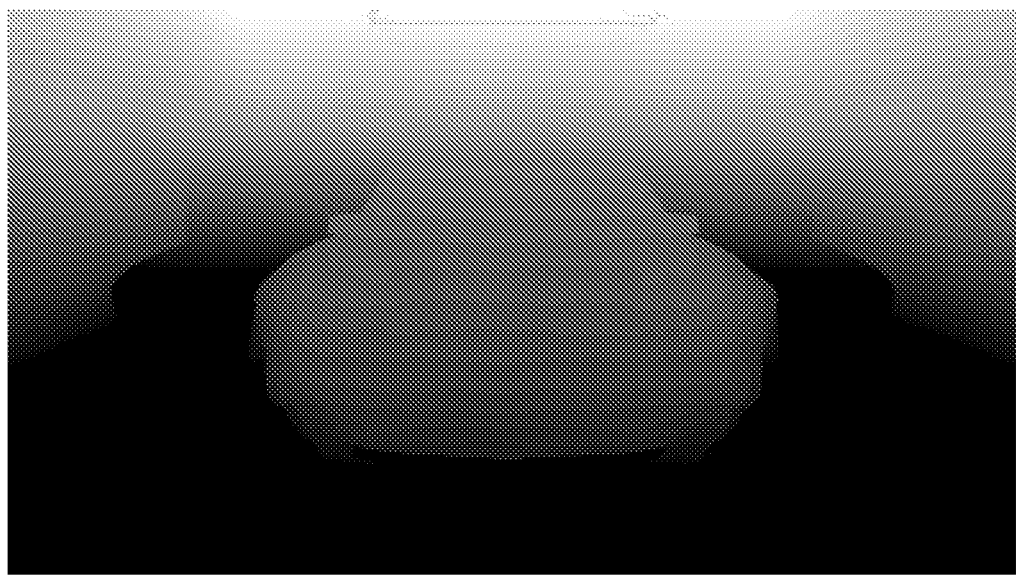

FIG. 12A shows a tapestry image generated from a combination of information from three views. FIGS. 12B-12D each shows one dimension of a 3-D world coordinates map associated with the tapestry image of FIG. 12A. As in FIGS. 9A-9C, each of the x, y, and z coordinates is mapped, for visualization purposes, to a red (R), green (G), and blue (B) channel. Although the tapestry is derived from a virtual/synthetic scene, information to derive the tapestry could also have been captured by taking pictures from various viewpoints of a real environment using, for instance, one or more cameras.

Similar to FIG. 8, the strange (from a subjective point of view) warping shows distortion involved to include information on portions of the background and the car only visible from certain perspectives. Association with each pixel in the tapestry image of FIG. 12A with coordinates from the 3-D world coordinates map provided in FIGS. 12B-12D can enable this distortion to be removed during rendering/derivation of various viewpoints from the tapestry information provided in FIGS. 12A-12D.

Figure 13C:
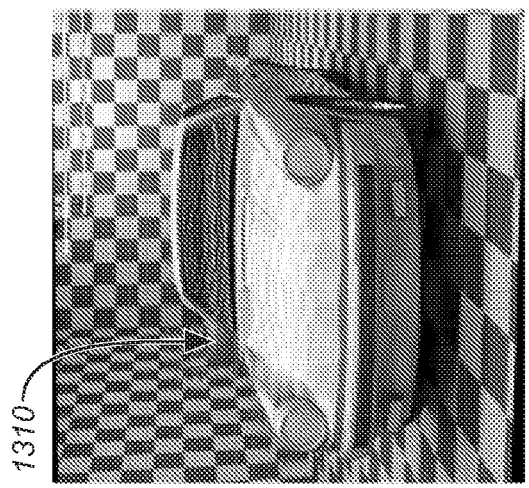
FIGS. 13A-13C show examples of views generated from the tapestry of FIGS. 12A-12D. Specifically.
Figure 13B:
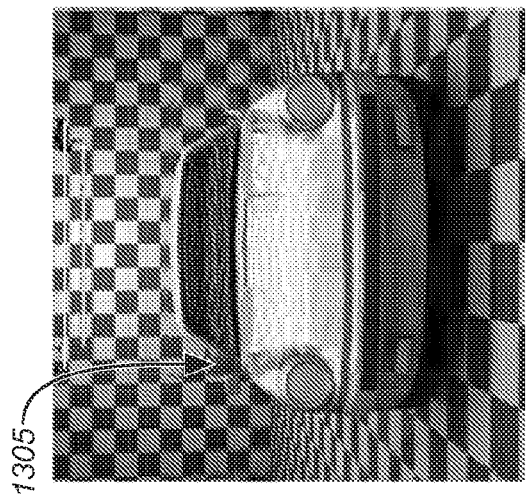
Figure 13A:
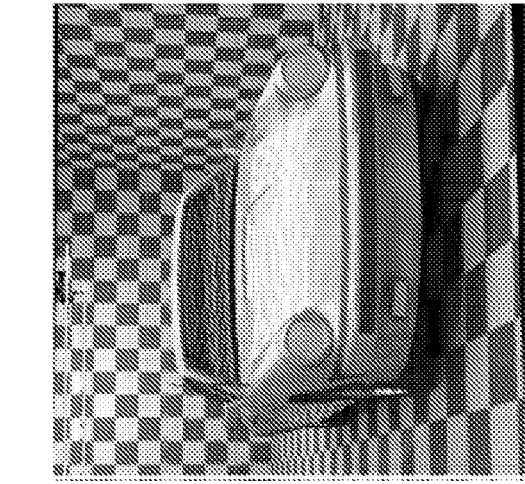

FIGS. 13A-13C show examples of views generated from the tapestry of FIGS. 12A and 12B. Specifically, FIGS. 13A-13C show a left view, a central view, and a right view, respectively. As shown in FIGS. 13A-13C, the tapestry provides information to generate many areas of the background and the car, although some errors (e.g., 1305, 1310) are evident.

Figure 14:
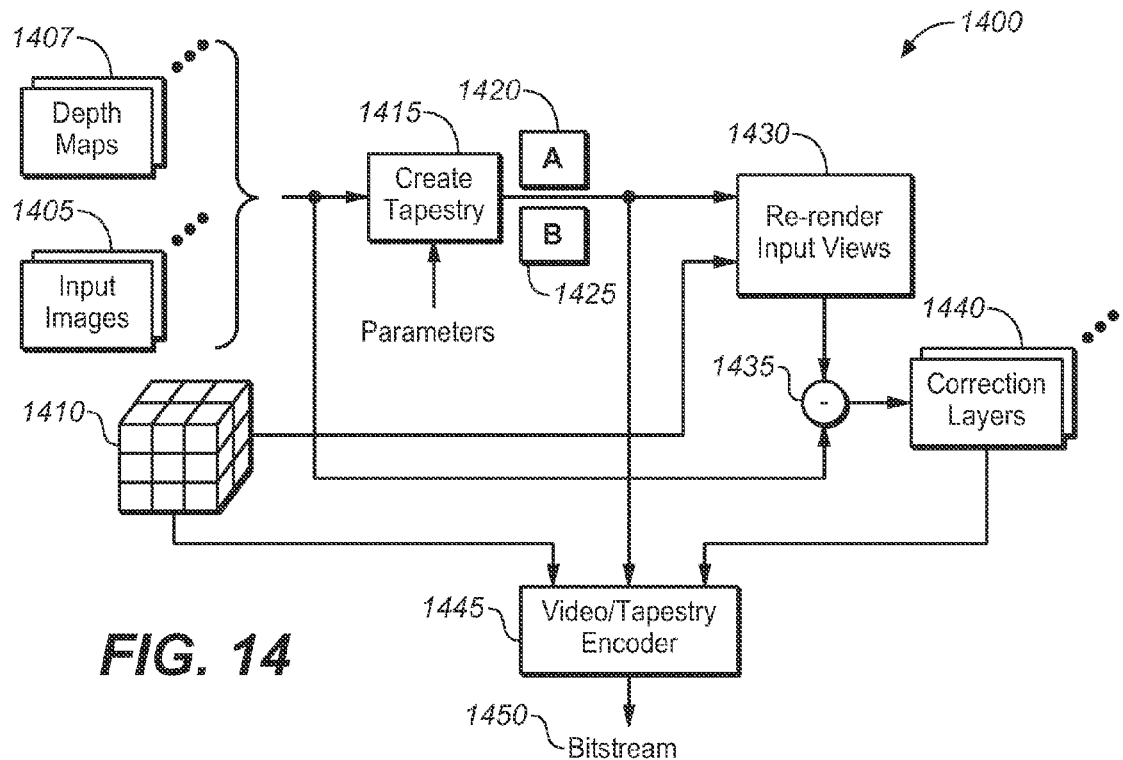
FIG. 14 shows an exemplary encoding system for generating tapestry information and encoding video information, inclusive of the tapestry information.

FIG. 14 shows an exemplary encoding system (1400) for generating tapestry information and encoding video information, inclusive of the tapestry information. For video to be encoded, an input for each frame of the video comprises N input perspective images (1405) and N depth maps (1407), where each input perspective image is associated with a depth map. The N input perspective images (1405), in effect, define a "scene" or "world".

A 3-D camera grid (1410) containing information pertaining to the N viewpoints and frusta corresponding to the input perspective images (1405) can optionally be provided for encoding. As previously mentioned, the 3-D camera grid (1410) can comprise information on allowed viewpoints and frusta (such as boundaries of each viewpoint and corresponding frustum). It should be noted that the input perspective images (1405), and consequently the depth maps (1407) as well as 3-D camera grid (1410) associated with the input perspective images (1405) can be captured (e.g., straight from a camera) and/or derived (e.g., rendered based on captured perspective images and/or other derived perspective images).

The input perspective images (1405) and the depth maps (1407) associated with the input perspective images (1405) are utilized in creating a tapestry (1415) using a tapestry generation unit (1415). Outputs of the tapestry generation unit (1415) comprise a tapestry image A (1420) and a 3-D world coordinates array B (1425), where both A (1420) and B (1425) are associated with the scene/world defined by the input perspective images (1405) and corresponding depth maps (1407). The tapestry generation unit (1415) can create a tapestry based on input parameters such as a selected output view or views and resolution of the tapestry. Also, determinations on how to allocate area in the tapestry image, such as manually-based, saliency-based, and/or frequency-based, may be set based on the input parameters.

It should be noted that the depth maps (1407) can be provided to the tapestry generation unit (1415) directly or the tapestry generation unit (1415) can derive the depth maps (1407). Multi-view stereo matching algorithms, for instance, may be utilized to derive 3-D position data for pixels in images, where the 3-D position data includes depth values and/or data that can be mapped to depth values.

Information from the input perspective images (1405) and, if applicable, associated 3-D camera grid (1410) can be provided to a rendering unit (1430), which generates (1430) re-rendered input views based on the input information (1405, 1410). These re-rendered input views are predictions/estimations of the input perspective images (1405). Consequently, taking a difference (1435) via a subtraction unit (1435) generates correction layers (1440) comprising residual information. Each correction layer (1440) corresponds to one input perspective image (1405). It should be noted that operations performed and precision utilized (e.g., quantization) by the rendering unit (1430) on the encoder side are generally similar to those for a rendering unit on the decoder side.

Information pertaining to the 3-D camera grid (1410), the tapestry image A (1420), the 3-D world coordinates array B (1425), and the correction layers (1440) can be provided to be encoded into a bitstream (1450) using an encoder (1445). The bitstream (1450) is adapted to be transmitted to and decoded by a decoder (e.g., shown in FIG. 15). Although one bitstream (1450) is shown in FIG. 14, the encoder (1445) can encode the various information into a plurality of bitstreams. As an example, a first bitstream can contain the tapestry information from the tapestry image A (1420) and the 3-D world coordinates array B (1425); a second bitstream can contain information from the correction layers (1440); and a third bitstream can contain information from the 3-D camera grid (1410), which can be encoded as metadata and transmitted along with the first and second bitstreams.

It should be noted that the encoder can, but need not, generate the correction layers (1440) and encode and transmit the 3-D camera grid (1410) and the correction layers (1440).

Figure 15:
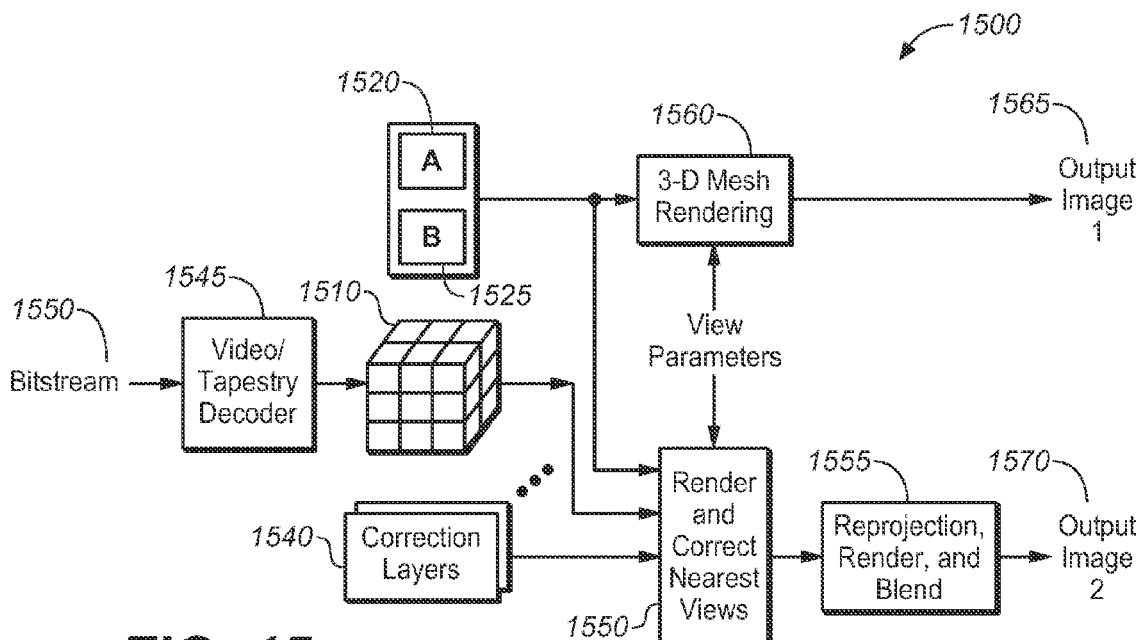
FIG. 15 shows an exemplary decoding system configured to decode information from the exemplary encoding system of FIG. 14.

FIG. 15 shows an exemplary decoding system (1500) configured to decode information from the exemplary encoding system of FIG. 14. A bitstream (1550), such as that shown also in FIG. 14, provides an input to the decoding system (1500). The bitstream (1550) is adapted to be decoded via a decoder (1545). Tapestry image A (1520), 3-D world coordinates array B (1525), and, if applicable, 3-D camera grid (1510) and correction layers (1540) can be decoded from the bitstream (1550). Multiple processes may be followed to generate output images (1565, 1570). As noted for the encoder side, the decoder side can also receive from an encoder a plurality of bitstreams.

The tapestry information, comprising the tapestry image A (1520) and the 3-D world coordinates array B (1525), can be rendered into a 3-D mesh (1560) by a 3-D mesh rendering unit (1560). The exemplary method for 3-D mesh rendering provided in FIG. 11 can be utilized in generating an output of the 3-D mesh rendering unit (1560). The 3-D mesh (1560) from the 3-D mesh rendering unit (1560) can serve as an output image (1565) of the decoding system (1500).

Optionally, information from the 3-D camera grid (1510) and the correction layers (1540) can also be utilized in generating an output image (1570). Such information (1510, 1540) can be utilized in rendering, correcting, and reprojecting information from one or more views associated with the output image (1570) to form the output image (1570). Utilization of the information from the 3-D camera grid (1510) and the correction layers (1540) can generally yield output images of higher image quality (e.g., fewer errors).

With reference back to FIG. 14, an exemplary method for generation of a tapestry comprising a tapestry image (1420) and 3-D world coordinates map (1425) is provided as follows.

An initial step comprises selecting a default view from among the perspectives associated with the input images (1405). This default view may be, for instance, given as input, selected from one or more input views, or determined automatically as an average or weighted average of input views.

Three-dimensional world coordinates from every input view can be reprojected into the default view, resulting in a multi-depth image. Each pixel in the default view can be categorized to a particular depth layer or depth step based on value of a depth map associated with the pixel. Information pertaining to which of the input perspective images (1405) can see a particular depth layer/step can be generated. An exemplary number of depth layers/steps is eight (e.g., with 0 being closest to an origin of the central perspective and 8 being the farthest). However, more or fewer depth layers/steps can be utilized.

For each pixel in a default view output image, voting, also referred to as providing/deriving a weight or preference, is performed to elect one or more perspective images from among the input perspective images (1405). One exemplary method of electing the perspective image or images is by electing those images with the most/nearest points to the depth layer associated with a particular pixel in the default view output image.

For the elected image, a preference is recorded for the perspective view associated with the elected image along a vector corresponding to a separation of the nearest and farthest points at this default view as seen in the elected view. A recording of a 2-D offset of a foreground pixel to an output pixel position is performed to anchor the elected view to that particular pixel in the default view output image.

For each pixel in the default view output image, an average offset can be computed and a preferred view (also referred to as most popular view) can be computed and selected from statistics previously gathered. Actual pixel color and 3-D coordinates of the preferred view at a particular pixel can be rendered by tracing a ray into an image that is treated as a height field.

An exemplary method for creating tapestries is provided in the code attached hereto as Annex A, which forms an integral part of the present disclosure. In general, a tapestry to be used for derivation of one or more viewpoints should be a connected map of visible scene pixels with larger image area allocated to more sharply focused and/or more important regions. Generation of such tapestries generally involves solving an underconstrained optimization problem with a plurality of dimensions. As a result, many opportunities exist for improving the capture and encoding side of the equation.

It should be noted that C code is provided as an example. Steps in the tapestry creating method can be written in any of the primary programming languages, such as Perl, Python, C++, Java, Fortran, etc., and can be implemented to run on both individual PCs and multi-node clusters. The executable steps according to the methods and algorithms of the disclosure can be stored on a medium, a computer, or on a computer readable medium. The various steps can be performed in multiple processor mode or single-processor mode. All programs should be able to run with minimal modification on most individual PCs.

Useful Properties

In general, since tapestry images (such as those shown in FIGS. 8 and 12A) contain warped and sometimes occluded image information, the tapestry images can allow local adjustment of resolution based on disproportionate allocation of image pixels in the tapestry images. Such local adjustment in resolution can allow allocation of information for important details in a picture (e.g., faces) while sacrificing resolution in out-of-focus and peripheral areas of a scene.

For example, information in a facial close-up can be captured from multiple perspectives. Although the tapestry image would likely be warped (similar to those shown in FIGS. 8 and 12A), the tapestry image can essentially wrap around a subject's head such that a reprojection can output high detail/resolution images pertaining to the subject's head. Information on a subject's face, left ear, and right ear can be captured in images derived from the tapestry almost as if all of the face and ears are facing directly into a camera. The facial close-up may appear larger and/or of higher detail/resolution than it would be if rendered straight from any view or views in the 3-D camera grid and may include information from multiple viewpoints. In contrast, an unimportant background can take less area and appear more unfocused than it would be if rendered straight from the final views generated straight from the tapestries (without adjustments) because less resolution is generally needed for the background, particularly when it is indistinct.

In addition to providing geometry information for pixel reprojection, the 3-D world coordinates array provides direct information on pixel motion resulting from changing viewpoints, which can be utilized by a coding system to improve performance (e.g., computational complexity, accuracy, and bitrate). By ordering the view correction layers with a 3-D Hilbert traversal, MPEG encoding could also be used to reduce the footprint of this data subset.

Disjoint Geometry

Small, disjoint geometry can cause visibility errors in an output image if not handled carefully. Each pixel in the output image is associated with a depth value. With reference to FIGS. 13A-13C, a discontinuity in depth values between the checkerboard background and the car yields a determination that a set of polygons associated with the checkerboard background should be separate from a set of polygons associated with the car, and consequently these sets of polygons should not be stitched together. Stitching the sets of polygons together would cause the car to be attached to the checkerboard background behind the car.

A threshold may be utilized to determine whether or not there is a sufficiently large discontinuity. Such a determination determines whether or not certain polygons should be stitched together. For example, as shown in FIGS. 13A-13C, an antenna on the car cannot be represented for all views in a connected mesh, since such connections will create large triangles (1305, 1310) attached from the antenna to the surfaces behind the antenna.

One exemplary method to deal with such errors is to set a distance threshold above which a particular geometry is considered disjoint and rendered separately. As previously described, a mesh can be formed from connecting (and not connecting) various polygons (e.g., quadrilaterals, triangles, and so forth). If a distance between two aspects of an image (e.g., a car in the foreground and a wall in the background) is larger than a set distance threshold, the polygons are not connected and the particular aspects are considered disjoint and rendered separately.

As illustrated, the antenna is connected to the car at 1305 and 1310, which signifies that a depth difference between the antenna and portions of the car was below threshold, while the antenna is not connected to the checkerboard background, which signifies that a depth difference between the antenna and the checkerboard background was above threshold. Correcting for these errors during rendering will generally be computationally and memory expensive without utilizing particular methods to handle such small, disjoint geometries.

Another exemplary method is to set aside some region of the tapestry detached from a main image within the tapestry where such information (e.g., texture, geometry, etc.) may be stored. An example of an area for storing disjoint/detached information can be those disconnected areas in 1130 of FIG. 11. An area surrounding this allocated region will be provided with a special or illegal value to break its continuity from the main image. The area may be stored, for instance, in the tapestry's perimeter so as not to disrupt parts of the main image that are considered continuous.

This area is generally small relative to the other parts of the main image, since small geometry can generally be safely represented as continuous even when it is not unless the small geometry happens to be very close to an origin of a view frustum. In such cases, the geometry is generally considered large enough and/or important enough to warrant a larger area in the tapestry. In some cases, lower resolution can be provided for the large geometry when the large geometry appears to be fast-moving and/or blurred. Consequently, with reference back to FIGS. 13A-13C, an area in the tapestry image can be allocated to representing the antenna as disjoint geometry.

As shown in the previous discussion, a tapestry image and its corresponding 3-D world coordinates can be used to generate estimations of various views. Such images can be used to form a movie, where viewers can watch a series of images from whatever viewpoints are allowed by the tapestry. Representing an entire scene or portion thereof can involve use or generation of additional information such as positioning of light sources (e.g., image-based lighting environment) for the scene or rendering of other objects into the scene dynamically.

The methods and systems described in the present disclosure may be implemented in hardware, software, firmware, or combination thereof. Features described as blocks, modules, or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM) and may be magnetic and/or optical. The instructions may be executed by a processor (e.g., a digital signal processor (DSP), an application specific integrated circuit (ASIC), or a field programmable logic array (FPGA)).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

The examples set forth above are provided to give those of ordinary skill in the art a complete disclosure and description of how to make and use the embodiments of the representation and coding of multi-view images using tapestry encoding of the disclosure, and are not intended to limit the scope of what the inventors regard as their disclosure. Modifications of the above-described modes for carrying out the disclosure may be used by persons of skill in the video art, and are intended to be within the scope of the following claims.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] J. P. Grossman, William Dally, "Point Sample Rendering", Rendering Techniques '98, Proceedings of the 1998 Eurographics Workshop on Rendering.

[2] Paul Rademacher and Gary Bishop, "Multiple-Center-of-Projection Images", Proceedings of SIGGRAPH '98, website accessed Sep. 28, 2011. http://www.paul-rademacher.com/unc/papers/Rademacher-mcop98.pdf

[3] Erik Reinhard, Greg Ward, Sumant Pattanaik, Paul Debevec, *High Dynamic Range Imaging: Acquisition, Display, and Image-based Lighting*, Morgan Kaufmann Publishers, 2005.

[4] Maryann Simmons and Carlo Sequin, "Tapestry: Dynamic Mesh-based Display representation for Interactive Rendering", Eurographics Workshop on Rendering 2000.

[5] M. Lang, A. Hornung, O. Wang, S. Poulakos, A. Smolic, and M. Gross, "Nonlinear Disparity Mapping for Stereoscopic 3D" (July 2010). To appear in ACM Transactions on Graphics (Proc. SIGGRAPH).

[6] K. J. Oh et al., "Hole-Filling Method Using Depth Based In-painting for View Synthesis in Free Viewpoint Television and 3D Video" (2009). Proc. Picture Coding Symposium (PCS), pp. 1-4.

© 2011 Dolby Licensing Corporation (17 USC 401).

Annex A

```
/* mktapestry.h
 *
 * Includes and externals for tapestry builder.
 * (assumes <stdio.h> already loaded)
 * Created by Greg Ward on Feb. 28, 2011.
 * Copyright 2011 Dolby Laboratories. All rights reserved.
 */
#ifndef _MKTAPESTRY_H_
#define _MKTAPESTRY_H_
#include "rtmath.h"
#include "color.h"
#include "view.h"
```

```c
#ifdef _cplusplus
extern "C" {
#endif
/* In-core or memory-mapped image with depth buffer */
typedef struct {
char fname[64]; /* file name */
VIEW vw; /* image view */
RESOLU rs; /* image size and orientation */
double p2h, p2v; /* ratio of our view size to parent's */
double expval; /* exposure value for picture */
char fmt[32]; /* picture format */
uby8 *pmap; /* memory mapped picture origin */
COLR *pimg; /* start of RGBE image */
float *dimg; /* start of depth image */
float drng[2]; /* depth min. & max. */
uby8 *dfli; /* depth flag image (parent res.) */
float *pref; /* where we're preferred (in parent) */
} InPicture;
#define TPcolrScan(p,y)  ((p)->pimg+scanlen(&(p)->rs)*(y))
#defineTPdpthScan(p,y)   ((p)->dimg+scanlen(&(p)->rs)*(y))
/* Main struct used for building tapestries */
typedef struct {
VIEW tvw; /* tapestry target view */
RESOLU trs; /* tapestry target size */
double pixaspect; /* target pixel aspect ratio */
uint16 *edbuf[8]; /* encoded multi-depth buffers */
float (*offs)[2]; /* sum of delta (x,y) for best views */
int ninp; /* number of input pictures */
InPicture inp[1]; /* input pictures (extends struct) */
} TapestryObj;
#define TPedScan(t,m,y) ((t)->edbuf[m]+scanlen(&(t)->trs)*(y))
#define TPoffsum(t,x,y) (t)->offs[scanlen(&(t)->trs)*(y)+(x)]
#defineTPdfScan(t,i,y) ((t)->inp[i].dfli+scanlen(&(t)->trs)*(y))
#define TPprScan(t,i,y) ((t)->inp[i].pref+scanlen(&(t)->trs)*(y))
extern double TPviewDistance(const VIEW *v1p, const VIEW *v2p);
extern int TPpicNearest(int *parr, int len,const VIEW *vp, const TapestryObj *tp);
extern int TPmapLocation(FVECT loc,
const VIEW *vsrc, const VIEW *vdst);
extern int TPencodeDepth(double dpth);
extern double TPdecodeDepth(int dc);
/****************************************************
********************
* Application calls are given below.
*
* A simple call sequence is:
* tp=TPnewTapestry(n);
* for (i=0; i<n; i++)
*    TPopenPicture(TPinp(tp,i), pname[i], zname[i]);
* TPrenderTapestry(hdr_name, pt3_name, tp, imgwidth, imgheight);
* TPfreeTapestry(tp);
*
* Most calls return NULL unless there was a fatal error,
* in which case an English message is returned. No calls should
* be made after an error return other than TPfreeTapestry( ).
*/
/* Macro to return pointer to ith input picture */
#defineTPinp(t,i) (&(t)->inp[i])
/* Allocate a tapestry object for ni input images */
extern TapestryObj *TPnewTapestry(int ni);
/* Open a Radiance RGBE (or XYZE) picture and associated depth buffer */
extern const char *TPopenPicture(InPicture *ip, const char *pname,const char *zname);
/* Is the given input picture ready? */
extern int TPpicReady(const InPicture *ip);
/* Choose view nearest to average of open pictures */
extern const VIEW *TPcentralView(const TapestryObj *tp);
/* Map our input views into the default view, recording multiple depths */
extern const char *TPmapPictures(TapestryObj *tp);
/* Determine optimal view at each pixel in tapestry */
extern const char *TPchooseViews(TapestryObj *tp);
/* Output completed tapestry and (optionally) a 3-D coordinate image */
extern const char *TPoutputTapestry(const char *pname, const char *cname,TapestryObj *tp);
/* Combined tapestry creation and rendering
* Default view is selected by TPcentralView( ).
* Resolution is taken from first input if xres and yres are 0.
* Calls TPmapPictures( ), TPchooseViews( ), then TPoutputTapestry( ).
* Frees all temporary buffers but leaves inputs open.
*/
extern const char *TPrenderTapestry(const char *pname, const char *cname,TapestryObj *tp, int xres, int yres);
/* Free a tapestry object, closing all input files and cleaning up memory */
extern void TPfreeTapestry(TapestryObj *tp);
#ifdef _cplusplus
}
#endif
#endif /* _MKTAPESTRY_H_ */
/*
* mktapestry1.c
*
* Create a tapestry image and 3-D world coordinate buffer
* from a set of Radiance pictures and z-buffers.
* Initialization, shared functions, combined call
*
* Created by Greg Ward on Feb. 28, 2011.
* Copyright 2011 Dolby Laboratories. All rights reserved.
*
*/
#include <stdio.h>
#include <string.h>
#include <unistd.h>
#include <fcntl.h>
#include <sys/mman.h>
#include "mktapestry.h"
/* Allocate a tapestry object for ni input images */
TapestryObj *
TPnewTapestry(int ni)
{
TapestryObj *ntp; if (ni<=0) return NULL;
ntp=(TapestryObj *)malloc(sizeof(TapestryObj)+sizeof(InPicture)*(ni-1));
if (ntp==NULL) return NULL;
ntp->tvw=stdview;
```

```c
ntp->trs.rt=PIXSTANDARD;
ntp->trs.xr=1920;
ntp->trs.yr=1920;
ntp->pixaspect=1.;
memset(ntp->edbuf, 0, sizeof(ntp->edbuf));
ntp->offs=NULL;
memset(ntp->inp, 0, sizeof(InPicture)*ni);
ntp->ninp=ni;
return ntp;
}
/* Free/unload a particular image */
static void
TPclosePicture(InPicture *ip)
{
if (ip->dfli !=NULL) {
free(ip->dfli);
ip->dfli=NULL;
}
if (ip->pref !=NULL) {free(ip->pref);
ip->pref=NULL;
}if (ip->pmap !=NULL) {munmap(ip->pmap, ((uby8 *)ip-
>pimg-ip->pmap)+sizeof(COLR)*ip->rs.xr*ip->rs.yr);
ip->pmap=NULL;
ip->pimg=NULL;
}
if (ip->dimg !=NULL) {munmap(ip->dimg, sizeof(float)
*ip->rs.xr*ip->rs.yr);
ip->dimg=NULL;
}
}
/* Free a tapestry object, closing all input files and cleaning
up memory */void
TPfreeTapestry(TapestryObj *tp)
{int i;for (i=8; i--;)
if (tp->edbuf[i] !=NULL)
free(tp->edbuf[i]);
if (tp->offs !=NULL)
free(tp->offs);
for (i=tp->ninp; i--;)
TPclosePicture(&tp->inp[i]);
free(tp);
}
/* Is the given input picture ready? */
int
TPpicReady(const InPicture *ip)
{
if (ip->pimg==NULL)
return 0;
if (ip->dimg==NULL)
return 0;
if (!ip->vw.type)
return 0;
if ((ip->rs.xr<=0)|(ip->rs.yr<=0))
return 0;
return (ip->expval>0.0);
}
/* Get line from Radiance header and record info. */
static int
TPheadLine(char *ln, void *p)
{
InPicture *ip=(InPicture *)p;
if (isexpos(ln)) {ip->expval *, exposval(ln);
return (ip->expval>0.0) ? 0: -1;
}
if (isview(ln)) {sscanview(&ip->vw, ln);
return 0;
}
if (formatval(ip->fmt, ln))
return 0;
/* Ignore lines we don't understand */
return 0;
}
/* Open a Radiance RGBE (or XYZE) picture and associ-
ated depth buffer */
const char *
TPopenPicture(InPicture *ip, const char *pname, const char
*zname)
{
FILE *infp;
char *very;
int i;
int dfd;
off_t imgStart, imgEnd;
/* close previous first */
TPclosePicture(ip);
i=strlen(pname)+(1-sizeof(ip->fname));
i *=(i>0);
strcpy(ip->fname, pname+i);
infp=fopen(pname, "rb"); /* open Radiance picture */
if (infp==NULL)
return "cannot open Radiance picture";
ip->vw=stdview;
ip->expval=1.;
strcpy(ip->fmt, COLRFMT);
if (getheader(infp, &TPheadLine, ip)<0) {fclose(infp);
return "error in Radiance picture format";
}
if (ip->vw.type !=VT_PER) {
fclose(infp);
return "only perspective input pictures supported";
}
if (ip->vw.vfore>FTINY) {fclose(infp);
return "pictures with fore clipping planes not supported";
}
if ((verr=setview(&ip->vw)) !=NULL) {
fclose(infp);
return verr;
}
if (!fgetsresolu(&ip->rs, infp)) {
fclose(infp);
return "bad resolution string in Radiance picture";
}
ip->p2h=ip->p2v=0.0;
imgStart=ftello(infp);
/* try mapping the picture to memory */
if (fseeko(infp, 0, SEEK_END)==EOF) {fclose(infp);
return "cannot seek on Radiance picture";
}
imgEnd=ftello(infp); /* we can map flat picture files */
if (imgEnd-imgStart==sizeof(COLR)*ip->rs.xr*ip->rs.yr)
{
ip->pmap=(uby8 *)mmap(0, imgEnd, PROT_READ,
MAP_PRIVATE|MAP_FILE, fileno(infp), 0);
if (ip->pmap==MAP_FAILED)
ip->pmap=NULL;
else
ip->pimg=(COLR *)(ip->pmap+imgStart);
}
if (ip->pmap==NULL) {/* otherwise, load into memory */
const int ns=numscans(&ip->rs);
const int sl=scanlen(&ip->rs);
int y;
ip->pmap=mmap(0, sizeof(COLR)*ip->rs.xr*ip->rs.yr,
PROT_WRITE|PROT_READ,
```

```c
MAP_PRIVATE|MAP_ANON, -1, 0);
if (ip->pmap==MAP_FAILED) {
ip->pmap=NULL;
fclose(infp);
return "out of memory in TPopenPictureQ";
}
ip->pimg=(COLR *)ip->pmap;
fseeko(infp, imgStart, SEEK_SET);
for (y=0; y<ns; y++)
if (freadcolrs(TPcolrScan(ip,y), sl, infp)<0) {
fclose(infp);
return "error reading Radiance picture";
}
}
fclose(infp);
/* map the depth buffer to memory */
dfd=open(zname, O_RDONLY);
if (dfd <0)
return "cannot open depth buffer file";
imgEnd=lseek(dfd, 0, SEEK_END);
if (imgEnd !=sizeof(float)*ip->rs.xr*ip->rs.yr) {
close(dfd);
return "unexpected length for depth buffer file";
}
ip->dimg=(float *)mmap(0, imgEnd, PROT_READ,
MAP_PRIVATE|MAP_FILE, dfd, 0);
close(dfd);
if (ip->dimg==MAP_FAILED) {
ip->dimg=NULL;
return "failure mapping depth buffer into memory";
}
ip->drng[0]=/* get extrema */
ip->drng[1]=ip->dimg[0];
for (i=ip->rs.xr*ip->rs.yr; --i;)
if (ip->dimg[i]<ip->drng[0])
ip->drng[0]=ip->dimg[i];
else if (ip->dimg[i]>ip->drng[1])
ip->drng[1]=ip->dimg[i];
return NULL; /* all is well */
}
#define DSCALE  2846.10546  /*  (2^16-2)/log(1e6/1e-4)
*/#define
DOFFS -9.21034037 /* log(1e-4) */
/* Encode a depth value to 16 bits (log range: 1e-4 to 1e6)
*/
int
TPencodeDepth(double dpth)
{
if (dpth <=1e-4)
return 1;
if (dpth>=1e6)
return 0xffff;
return (int)(DSCALE*(log(dpth)-DOFFS))+1;
}
/* Decode a 16-bit depth value */
double
TPdecodeDepth(int dc)
{
return exp((dc-1)*(1./DSCALE)+DOFFS);
}
#undef DSCALE
#undef DOFFS
/* Compute a distance metric between views (hueristic) */
double
TPviewDistance(const VIEW *v1p, const VIEW *v2p)
{
double d, d2sum;
FVECT v1c, v2c;
if (v1p->type==VT_PAR A v2p->type==VT_PAR)
return FHUGE;
d2sum=(double)(v1p->type !=v2p->type);
if (v1p->vdist <1.5*v2p->vdist && v2p->vdist <1.5*v1p->vdist) {
VSUM(v1c, v1p->vp, v1p->vdir, v1p->vdist);
VSUM(v2c, v2p->vp, v2p->vdir, v2p->vdist);
d2sum+=dist2(v1c,v2c)/(v1p->vdist*v2p->vdist);
} else
d2sum+=dist2(v1p->vp,v2p->vp)/(v1p->vdist*v2p->vdist);
d2sum+=dist2(v1p->hvec,v2p->hvec)/v1p->hn2;
d2sum+=dist2(v1p->vvec,v2p->vvec)/v2p->vn2;
d=v1p->hoff-v2p->hoff;
d2sum+=d*d;
d=v1p->voff-v2p->voff;
d2sum+=d*d;
d=v1p->vfore-v2p->vfore;
d2sum+=d*d/(v1p->vdist*v2p->vdist);
/* ignore aft clipping plane */
return d2sum;
}
/* Get ordered list of up to len pictures nearest the given
viewpoint */
int
TPpicNearest(int *parr, int len, const VIEW *vp, const
TapestryObj *tp)
{
int nc=0;
double *vwdist;
double d;
int i, j;
/* allocate array */
vwdist=(double *)malloc(sizeof(double)*len);
if (vwdist==NULL)
return 0;
/* insertion sort */
for (i=tp->ninp; i-->0;) 1
d=TPviewDistance(vp, &tp->inp[i].vw);
if (d>=FHUGE)
continue;
for (j=nc; j--;) {
if (d>=vwdist[j])
break;
if (j<len-1) {
vwdist[j+1]=vwdist[j];
parr[j+1]=parr[j];
}
}
nc+=(nc<len);
if (++j<nc) {
parr[j]=i;
vwdist[j]=d;
}
}
free(vwdist);
return nc;
}
/* Choose view nearest to average of open pictures */
const VIEW *
TPcentralView(const TapestryObj *tp)
{
int best;
VIEW vavg;
int i;
vavg=tp->inp[0].vw;
/* XXX we're assuming other params don't change */
```

```c
for (i=tp->ninp; --i;) {
VADD(vavg.vp, vavg.vp, tp->inp[i].vw.vp);
VADD(vavg.vup, vavg.vup, tp->inp[i].vw.vup);
VADD(vavg.vdir, vavg.vdir, tp->inp[i].vw.vdir);
}
vavg.vp[0] 1=(double)tp->ninp;
vavg.vp[1] 1=(double)tp->ninp;
vavg.vp[2] 1=(double)tp->ninp;
if (setview(&vavg) !=NULL)
return NULL;
vavg.vdist=1.; /* doesn't really affect us */if
(!TPpicNearest(&best, 1, &vavg, tp))
return NULL;
return &tp->inp[best].vw;
}
/* Map an image location between views */
int
TPmapLocation(FVECT loc, const VIEW *vsrc, const
VIEW *vdst)
{
FVECT pscene, pdir;
if (viewray(pscene, pdir, (VIEW *)vsrc, loc[0], loc[1])<-
FTINY)
return 0;
VSUM(pscene, pscene, pdir, loc[2]);
viewloc(loc, (VIEW *)vdst, pscene);
return (loc[2]>0.0);
}
/* Combined tapestry creation and rendering */
const char *
TPrenderTapestry(const char *pname, const char *cname,
TapestryObj *tp, int xres, int yres)
{
const char *err;
const VIEW *vctr;
int i;
/* check that we have something */
if (!TPpicReady(&tp->inp[0]))
return "no pictures loaded";
/* set output resolution */
tp->trs.xr=(xres>0) ? xres: tp->inp[0].rs.xr;
tp->trs.yr=(yres>0) ? yres: tp->inp[0].rs.yr;
/* choose central view */
if ((vctr=TPcentralView(tp))==NULL)
return "cannot determine central view";
tp->tvw=*vctr;
/* map depths into default view */
if ((err=TPmapPictures(tp)) !=NULL)
return err;
/* find best view at each pixel */
if ((err=TPchooseViews(tp)) !=NULL)
return err;
/* render to output */
if ((err=TPoutputTapestry(pname, cname, tp)) !=NULL)
return err;
/* free temp buffers */
free(tp->offs);
tp->offs=NULL;
for (i=tp->ninp; i--;) {
free(tp->inp[i].pref);
tp->inp[i].pref=NULL;
} return NULL; /* all done! */
}
/*
* mktapestry2.c
*
* Create a tapestry image and 3-D world coordinate buffer
* from a set of Radiance pictures and z-buffers.
*
* Routines for mapping pictures (phase 1):
* At each pixel in default view, record a list of distinct
* depths, near to far (up to 8), and flag which views see each.
*
* Created by Greg Ward on Feb. 28, 2011.
* Copyright 2011 Dolby Laboratories. All rights reserved.
*
*/
#include <stdio.h>
#include "mktapestry.h"
#ifndef DEPS
#define DEPS 5 /* depth epsilon for match */
#endif
/* Add a depth buffer to our set */
static int
TPaddDepthBuf(TapestryObj *tp)
{
int di;
for (di=0; tp->edbuf[di] !=NULL; di++)
if (di>=7)
return 0;
tp->edbuf[di]=(uint16 *)calloc(tp->trs.xr*tp->trs.yr, sizeof
(uint16));
return (tp->edbuf[di] !=NULL) ? 1: -1;
/* Insert a depth value to our buffers and adjust flags */
static int
TPinsertDepth(int pos[3], TapestryObj *tp, int ii)
{
InPicture *ip=&tp->inp[ii];
uint16 *dptr, *dptr2;
int di, di2, i;
/* make sure flags allocated */
if (ip->dfli==NULL) {
ip->dfli=(uby8 *)calloc(tp->trs.xr*tp->trs.yr, sizeof(uby8));
if (ip->dfli==NULL)
return -1;
}
/* find/insert depth */
for (di=0; di<8; di++) {
if (tp->edbuf[di]==NULL && TPaddDepthBuf(tp)<=0)
return -1;
dptr=TPedScan(tp,di,pos[1])+pos[0];
/* nothing here yet? */
if (!*dptr) {
*dptr=pos[2];
TPdfScan(tp,ii,pos[1])[pos[0]] 1=1<<di;
return 1;
}
/* close enough to call a match? */
if ((*dptr <=pos[2]+DEPS) & (pos[2]<=*dptr+DEPS)) {
TPdfScan(tp,ii,pos[1])[pos[0]] 1=1<<di;
return 1;
}
/* not reached depth yet? */
if (*dptr <pos[2])
continue;
/* else need to insert */
for (di2=di+1; di2<8; di2++) {
if (tp->edbuf[di2]==NULL && TPaddDepthBuf(tp)<=0)
```

```
return -1;
dptr2=TPedScan(tp,di2,pos[1])+pos[0];
if (!*dptr2)
break;
}
for (di2-=(di2>=8); di2>di; di2--) {
dptr=TPedScan(tp,di2-1,pos[1])+pos[0];
*dptr2=*dptr;
dptr2=dptr;
}
/* update picture flags */
for (i=tp->ninp; i--;) {
uby8 *dfp;
int fmask;
if (tp->inp[i].dfli==NULL)
continue;
fmask=(1<<di)-1;
dfp=TPdfScan(tp,i,pos[1])+pos[0];
*dfp=(*dfp & ~fmask)<<1|(*dfp & fmask);
}
/* finally, update this depth */
*dptr=pos[2];
TPdfScan(tp,ii,pos[1])[pos[0]] |=1<<di;
return 1;
}
/* depth complexity==8 -- ignore */
return 0;
}
/* Map a pixel position from the indicated image to the
default view */
static int
TPmapPosition(int pos[3], TapestryObj *tp, int ii)
{
InPicture *ip=&tp->inp[ii];
FVECT imp;
pix2loc(imp, &ip->rs, pos[0], pos[1]);
imp[2]=TPdpthScan(ip,pos[1])[pos[0]];
if (!TPmapLocation(imp, &ip->vw, &tp->tvw))
return 0;
if ((imp[0]<=FTINY)|(imp[0]>=1.-FTINY)||
(imp[1]<=FTINY)|(imp[1]>=1.-FTINY))
return 0;
loc2pix(pos, &tp->trs, imp[0], imp[1]);
pos[2]=TPencodeDepth(imp[2]);
return 1;
}
/* Map distances from the given image into our encoded
multidepth buffers */
static const char *
TPmapDepths(TapestryObj *tp, int ii)
{
InPicture *ip=&tp->inp[ii];
const int sameView=(!memcmp(&tp->trs, &ip->rs, sizeof
(RESOLU))
&& TPviewDistance(&tp->tvw, &ip->vw)<=FTINY);
int pos[3];
int x, y;
for (y=numscans(&ip->rs); y--;)
for (x=scanlen(&ip->rs); x--;) {
pos[0]=x; pos[1]=y;
if (sameView)
pos[2]=TPencodeDepth(TPdpthScan(ip,y)[x]);
else if (!TPmapPosition(pos, tp, ii))
continue;
if (TPinsertDepth(pos, tp, ii)<0)
return "out of depth memory in TPmapDepth( )";
}
```
```
return NULL;
}
/* Sort input pictures so the closest ones come first */
static int
TPsortInput(TapestryObj *tp)
{
int *inear;
InPicture *pnear;
int i, j, n;
if (tp->ninp <=1)
return 1;
inear=(int *)malloc(sizeof(int)*tp->ninp);
if (inear==NULL)
return 0;
n=TPpicNearest(inear, tp->ninp, &tp->tvw, tp);
if (!n)
return 0;
pnear=(InPicture *)malloc(sizeof(InPicture)*n);
for (i=n; i--;) {
pnear[i]=tp->inp[inear[i]];
tp->inp[inear[i]].vw.type=0;
}
free(inear);
for (i=tp->ninp; i-->n;) {
while (tp->inp[i].vw.type)
i--;
if (i<n)
break;
for (j=i; !tp->inp[H].vw.type;);
tp->inp[i]=tp->inp[j];
tp->inp[j].vw.type=0;
}
for (i=n; i--;)
tp->inp[i]=pnear[i];
    free(pnear);
    return n;
}
#define FEQ(a,b) ((a)<=1.001*(b) && (b)<=1.001*(a))
/* Map our input views into the default view, recording
multiple depths */
const char *
TPmapPictures(TapestryObj *tp)
{
const char
int i;
/* set our view */
if ((err=setview(&tp->tvw)) !=NULL)
return err;
normaspect(viewaspect(&tp->tvw), &tp->pixaspect,
&tp->trs.xr, &tp->trs.yr);
/* check input pictures */for
(i=0; i<tp->ninp; i++) {
if (!TPpicReady(&tp->inp[i]))
return "some input pictures not ready";
if (DOT(tp->inp[i].vw.vup, tp->tvw.vup)<1.-FTINY)
return "input picture up vectors must match output";
tp->inp[i].p2h=sqrt(tp->inp[i].vw.hn2/tp->tvw.hn2);
tp->inp[i].p2v=sqrt(tp->inp[i].vw.vn2/tp->tvw.vn2);
if (!i)
continue;
if (!FEQ(tp->inp[i].expval, tp->inp[0].expval))
return "input picture exposures do not match";
if (strcmp(tp->inp[i].fmt, tp->inp[0].fmt))
return "input formats do not match";
}
/* sort input pictures */TPsortInput(tp);
/* map our depth values */
```

```
for (i=0; i<tp->ninp; i++)
if ((err=TPmapDepths(tp, i)) !=NULL)
return err;
return NULL; /* all is well */
}
#undef FEQ
/*
 * mktapestry3.c
 *
 * Create a tapestry image and 3-D world coordinate buffer
 * from a set of Radiance pictures and z-buffers.
 *
 * Gather preferred view statistics in the destination image
 * (phase 2):
 * At each default view output pixel, vote for the input picture
 * & that sees the most/nearest points in our multidepth buffer.
 * Record preference for this view along the line segment that
 * connects the nearest 3-D position and the furthest in the
 * default view. Also record the 2-D offset of the foreground
 * pixel to the output pixel position, so we know where to
 * anchor the chosen view in the output image.
 *
 * Created by Greg Ward on Feb. 28, 2011.
 * Copyright 2011 Dolby Laboratories. All rights reserved.
 *
 */
#include <stdio.h>
#include <string.h>
#include "mktapestry.h"
#ifndef GAUSS_BLUR
#define GAUSS_BLUR 8 /* smoothing radius for results */
#endif
/* Return value associated with the given set of depth flags
 */
static int
TPdepthFlagVal(int fl)
{
static uby8 flagVal[256];
int i;
/* initialize on first run */
for (i=flagVal[255] ? 0: 256; i--;) {
int flv, vb;
/*
 * Point scale based on radical inverse means
 * front layer is worth more than all deeper
 * layers combined, second layer likewise . . .
 */
flagVal[i]=0;
vb=256;
for (flv=i; flv; flv>>=1)
flagVal[i]+=(flv & 1)*(vb>>=1);
}
return flagVal[fl];
}
/* Pick best view for this position in destination image */
static int
TPpicBest(TapestryObj *tp, int x, int y)
{
Int i, ibest, vbest, flv;
/* find best view at this pixel */
ibest=-1;
vbest=0;
for (i=0; i<tp->ninp; i++) {
flv=TPdepthFlagVal(TPdfScan(tp,i,y)[x]);
if (flv>vbest) {
ibest=i;
vbest=flv;
}
}
return ibest;
}
/* Vote our preference at this point in destination */
static void
TPdrawPoint(TapestryObj *tp, int ii, int x, int y, double wt,
double ox, double oy)
{
float *offs=TPoffsum(tp,x,y);
/* vote for offset */
offs[0]+=wt*ox;
offs[1]+=wt*oy;
/* vote for preferred view */
TPprScan(tp,ii,y)[x]+=wt;
}
/* Draw a voting line with a preferred view and offset */
static void
TPdrawPref(TapestryObj *tp, int ii, int x, int y, int dx, int dy,
int ox, int oy)
{
const int xmax=scanlen(&tp->trs)-1;
const int ymax=numscans(&tp->trs)-1;
long run2=0, rise2=0;
double d, r;
int xstep=1, ystep=1, n;
/* check for special case */
if (!dx & !dy) {
TPdrawPoint(tp, ii, x, y, TPdepthFlagVal(1), ox, oy);
return;
}
xstep-=2*(dx<0);
ystep-=2*(dy<0);
#if 0
/* #ifdef GAUSS_BLUR
/* draw past end to compensate */
d=2.*GAUSS_BLUR/sqrt(dx*dx+dy*dy);
dx+=(int)(d*dx+0.5*xstep);
dy+=(int)(d*dy+0.5*ystep);
#endif
/* clip line to image bounds */
if (x+dx<0) {
dy=dy*-x/dx;
dx=-x;
} else if (x+dx>xmax) {
dy=dy*(xmax-x)/dx;
dx=xmax-x;
}
if(y+dy<0) {
dx=dx*-y/dy;
dy=-y;
} else if (y+dy>ymax) {
dx=dx*(ymax-y)/dy;
dy=ymax-y;
}
/* finish drawing set-up */
dx*=xstep;
dy*=ystep;
n=(dx>dy) ? dx: dy;
d=TPdepthFlagVal(TPdfScan(tp,ii,y)[x]);
/* XXX r setting is highly heuristic */
r=0.0007*sqrt((double)tp->trs.xr*tp->trs.yr);
/* draw our line */
if (dx>=dy)
while (n>=0)
if (run2>=rise2) {
TPdrawPoint(tp, ii, x, y,
```

```
d*(r+n)/(50.*r+n), ox, oy);
n--;
x+=xstep;
rise2+=dy;
} else {
y+=ystep;
run2+=dx;
}
Else while (n>=0)
if (rise2>=run2) {
TPdrawPoint(tp, ii, x, y, d*(r+n)/(50.*r+n), ox, oy);
n--;
y+=ystep;
run2+=dx;
} else {x+=xstep;
rise2+=dy;
}
}
}
/* Vote for the given view at the given point in our output
*/
static int
TPvoteView(TapestryObj *tp, int ii, int x, int y)
{
InPicture=&tp->inp[ii];
FVECT loc;
int fl, di;
int pos[2], pos1[2];
/* compute front pixel translation */
pix2loc(loc, &tp->trs, x, y);
loc[2]=TPdecodeDepth(TPedScan(tp,O,y)[x]);
if (!TPmapLocation(loc, &tp->tvw, &ip->vw))
return 0;
loc2pix(pos, &tp->trs,
(loc[0]-0.5+ip->vw.hoff)*ip->p2h+0.5-tp->tvw.hoff,
(loc[1]-0.5+ip->vw.voff)*ip->p2v+0.5-tp->tvw.voff);
/* get position of furthest depth */
fl=TPdfScan(tp,ii,y)[x];
for (di=0; fl & ~1; fl>>=1)
di++;
if (di) {pix2loc(loc, &tp->trs, x, y);
loc[2]=TPdecodeDepth(TPedScan(tp,di,y)[x]);
if (!TPmapLocation(loc, &tp->tvw, &ip->vw)) return 0;
loc2pix(pos1, &tp->trs, (loc[0]-0.5+ip->vw.hoff)*ip->p2h+
0.5-tp->tvw.hoff,  (loc[1]-0.5+ip->vw.voff)*ip->p2v+0.5-
tp->tvw.voff);
} else {pos1[0]=pos[0];
pos1[1]=pos[1];
}
/* draw our voting line */
TPdrawPref(tp, ii, x, y, pos1[0]-pos[0], pos1[1]-pos[1],
pos[0]-x, pos[1]-y);
return 1;
}
#ifdef GAUSS_BLUR
#define rbscan(yo) (rollingBuffer+(((yo)+bufRad)% buf-
Height)*xres)
/* Smooth the given floating-point image (in situ separable
Gaussian filter) */
static void
TPblurImage(float *img, const int xres, const int yres,
const int xstride, const int ystride)
{
const int bufRad=GAUSS_BLUR*3.2+0.5;
const int bufHeight=2*bufRad+1;
float *rollingBuffer, *gaussTab;
float *dp, *bp;
double sum;
int x, y, i;
/* sanity check */
if ((xres <=bufRad)|(yres <=bufRad))
return;
/* allocate rolling buffer */
rollingBuffer=(float  *)malloc(sizeof(float)*(xres+1)*buf-
Height);
if (rollingBuffer==NULL)
return;
/* set up Gaussian weight table */
gaussTab=rollingBuffer+xres*bufHeight+bufRad;
sum=0.0;
gaussTab[0]=1.f;
for (i=1; i<=bufRad; i++)
sum+=gaussTab[-i]=gaussTab[i]=
exp(-i*i*(1./GAUSS_BLUR/GAUSS_BLUR));
for (i=-bufRad; i<=bufRad; i++)
gaussTab[i] 1=sum;
/* filter image */
for (y=-bufRad; y<yres; y++) {
/* update rolling filter buffer */
if (y+bufRad>=yres) {
memcpy(rbscan(y+bufRad),  rbscan(y-1),  sizeof(float)
*xres);
} else {
dp=img+(y+bufRad)*ystride;
memset(bp=rbscan(y+bufRad), 0, sizeof(float)*xres);
for (x=0; x<xres; x++, bp++)
for (i=-bufRad; i<=bufRad; i++) {
int xi=x+bufRad+i;
if (xi<0) xi=0;
else if (xi>=xres) xi=xres-1;
*bp+=dp[xi*xstride] * gaussTab[i];
}
}
if (y<0)
continue;
if (!y) /* finish top scan initialization */
for (i=-bufRad; i<0; i++)
memcpy(rbscan(i), rbscan(0), sizeof(float)*xres);
dp=img+y*ystride; /* update final image */
for (x=xres; x--; dp+=xstride)
*dp=0.0f;
for (i=-bufRad; i<=bufRad; i++) {
by=rbscan(y+i);
dp=img+y*ystride;
for (x=xres; x--; dp+=xstride)
*dp+=*bp++* gaussTab[i];
}
}
/* clean up */
free(rollingBuffer);
}
#undef rbscan
#endif
/* Determine optimal view at each pixel in tapestry */
const char *
TPchooseViews(TapestryObj *tp)
{
const int xres=scanlen(&tp->trs);
const int yres=numscans(&tp->trs);
int i, x, y;
/* make sure we have what we need */
if (tp->edbuf[0]==NULL)
return "missing depth buffer in TPchooseViews( )";
for (i=0; i<tp->ninp; i++) {
if (tp->inp[i].dfli==NULL)
```

```
return "missing depth flags in TPchooseViews( )";
if (tp->inp[i].pref==NULL) {
tp->inp[i].pref=(float *)malloc(sizeof(float) *
tp->trs.xr*tp->trs.yr);
if (tp->inp[i].pref==NULL)
return "cannot allocate view preference buffer";
}
memset(tp->inp[i].pref, 0, sizeof(float)*tp->trs.xr*tp-
>trs.yr);
}
if (tp->offs==NULL) {
tp->offs=(float (*)[2])malloc(sizeof(float)*2*
tp->trs.xr*tp->trs.yr);
if (tp->offs==NULL)
return "cannot allocate offset array";
}
memset(tp->offs, 0, sizeof(float)*2*tp->trs.xr*tp->trs.yr);
/* vote for best view at each pixel */
for (y=yres; y--;)
for (x=xres; x--;)
if ((i=TPpicBest(tp, x, y))>=0)
TPvoteView(tp, i, x, y);
/* free buffers we no longer need */for
(i=0; i<8 && tp->edbuf[i] !=NULL; i++) {
free(tp->edbuf[i]); tp->edbuf[i]=NULL;
}
for (i=0; i<tp->ninp; i++) {
free(tp->inp[1].dfli); tp->inp[1].dfli=NULL;
}
#ifdef GAUSS_BLUR /* smooth results */
TPblurImage(&tp->offs[0][0], xres, yres, 2, 2*xres);
TPblurImage(&tp->offs[0][1], xres, yres, 2, 2*xres);
for (i=0; i<tp->ninp; i++)
TPblurImage(tp->inp[1].pref, xres, yres, 1, xres);
#endif
return NULL;
}
/*
* mktapestry4.c
* Create a tapestry image and 3-D world coordinate buffer
* from a set of Radiance pictures and z-buffers.
* Render output image (phase 3):
* At each default view output pixel, compute the average offset
* and preferred view from statistics gathered in phase 2.
* Render the actual pixel color and 3-D coordinate from
* the most popular view at this pixel by tracing a ray
* into the image treated as a height field.
* Created by Greg Ward on Feb. 28, 2011.
* Copyright 2011 Dolby Laboratories. All rights reserved.
*
*/
#include <stdio.h>
#include "mktapestry.h"
#include "platform.h"
/* Find exiting intersection with sphere */static
double
TPsphereExit(const FVECT rorg, const FVECT rdir, const
FVECT ctr, double rad)
{
FVECT OC;
double root[2];
int nroots;
VSUB(OC, rorg, ctr);
nroots=quadratic(root, 1., 2.*DOT(rdir,OC), DOT(OC,OC)-
rad*rad);
if (!nroots)
return 0.0;
return root[nroots-1];
}
/* Trace ray and intersect with picture as height field */
static int
TPhitPicture(COLR pc, FVECT rpos, const FVECT rdir,
InPicture *ip)
{
double D_h, D_v, OE_h, OE_v, D_L, OE_L, OE_D;
uby8 *clr;
FVECT OE;
int hdom;
int nsteps;
double vlim[2], hlim[2], tlim[2];
double h, v, t, d, hstep, vstep;
int inter[2];
/* precompute loop constants */
D_L=DOT(rdir, ip->vw.vdir);
if (D_L<=FTINY)
return 0;
/* not going to work */
D_h=DOT(rdir, ip->vw.hvec)/ip->vw.hn2;
D_v=DOT(rdir, ip->vw.vvec)/ip->vw.vn2;
/* advance to first possible depth */
t=0.9*TPsphereExit(rpos, rdir, ip->vw.vp, ip->drng[0]);
if (t>FTINY)
VSUM(rpos, rpos, rdir, t);
/* compute other constants */
VSUB(OE, rpos, ip->vw.vp);
OE_L=DOT(OE, ip->vw.vdir);
if (OE_L<=FTINY) {/* nudge start in front of viewpoint */
t=1e-3-OE_L/D_L;
VSUM(rpos, rpos, rdir, t);
VSUB(OE, rpos, ip->vw.vp);
OE_L=DOT(OE, ip->vw.vdir);
}
OE_D=DOT(OE, rdir); /* along sight lines (same view)? */
if (OE_D*OE_D>=0.999995*DOT(OE,OE)) {
FVECT vpos;
viewloc(vpos, (VIEW *)&ip->vw, rpos);
if ((vpos[0]<=FTINY) I (vpos[0]>=1.-FTINY))
return 0;
if ((vpos[1]<=FTINY) I (vpos[1]>=1.-FTINY))
return 0;
loc2pix(inter, (RESOLU *)&ip->rs, vpos[0], vpos[1]);
d=TPdpthScan(ip,inter[1])[inter[0]];
VSUM(rpos, ip->vw.vp, rdir, d);
clr=TPcolrScan(ip,inter[1])[inter[0]];
copycolr(pc, clr);
return 1;
}
OE_h=DOT(OE,ip->vw.hvec)/ip->vw.hn2;
OE_v=DOT(OE,ip->vw.vvec)/ip->vw.vn2;
/* find frustum entry & exit */hlim[0]
=(OE_h-(ip->vw.hoff+0.5)*OE_L)/((ip->vw.hoff+0.5)
*D_L-D_h);
if (hlim[0]*D_L<=-OE_L) hlim[0]=FHUGE;
hlim[1]=(OE_h-(ip->vw.hoff-.5)*OE_L)/((ip->vw.hoff-.5)
*D_L-D_h);
if (hlim[1]*D_L<=-OE_L) hlim[1]=FHUGE;
if (hlim[0]>hlim[1]) {t=hlim[0]; hlim[0]=hlim[1]; hlim[1]
=t;}
if (hlim[0]>=FHUGE)
return 0;
/* ray passes frustum by */
vlim[0]=(OE_v-(ip->vw.voff+0.5)*OE_L)/((ip->vw.voff+
0.5)*D_L-D_v);
```

```
if (vlim[0]*D_L<=-OE_L) vlim[0]=FHUGE;
vlim[1]=(OE_v-(ip->vw.voff-.5)*OE_L)/((ip->vw.voff-.5)
*D_L-D_v);
if (vlim[1]*D_L<=-OE_L) vlim[1]=FHUGE;
if  (vlim[0]>vlim[1])   {t=vlim[0];   vlim[0]=vlim[1];
vlim[1]=t;}
if (vlim[0]>=FHUGE)
return 0;
/* ray passes frustum by */
tlim[0]=(hlim[0]>vlim[0]) ? hlim[0]: vlim[0];
if (tlim[0]<0.0) tlim[0]=0.0;
tlim[1]=(hlim[1]<vlim[1]) ? hlim[1]: vlim[1];
/* check maximum picture depth */
t=1.1*TPsphereExit(rpos, rdir, ip->vw.vp, ip->drng[1]);
if (t<tlim[1])
tlim[1]=t;
if (tlim[1]<=tlim[0])
return 0;
/* now we know our limits */
hlim[0]=(tlim[0]*D_h+OE_h)/(tlim[0]*D_L+OE_L);
hlim[1]=(tlim[1]*D_h+OE_h)/(tlim[1]*D_L+OE_L);
vlim[0]=(tlim[0]*D_v+OE_v)/(tlim[0]*D_L+OE_L);
vlim[1]=(tlim[1]*D_v+OE_v)/(tlim[1]*D_L+OE_L);
hstep=ip->rs.xr*fabs(hlim[1]-hlim[0]);
vstep=ip->rs.yr*fabs(vlim[1]-vlim[0]);
hdom=(hstep>vstep);
nsteps=(hdom ? hstep: vstep)+0.999;
/* walk our picture as height field */
hstep=(hlim[1]-hlim[0])/nsteps;
vstep=(vlim[1]-vlim[0])/nsteps;
h=hlim[0]+0.5*hstep;
v=vlim[0]+0.5*vstep;
while (nsteps--) {/* check intersection at each step */
double d2;
if (nsteps)  t=hdom ?  (OE_h-h*OE_L)/(h*D_L-D_h):
(OE_v-v*OE_L)/(v*D_L-D_v);
else t=tlim[1]; /* make sure we reach endpoint */d2=(t+
OE_D)/(D_L+h*D_h*ip->vw.hn2+v*D_v*ip->vw.vn2);
d2 *=d2*(1. +h*h*ip->vw.hn2+v*v*ip->vw.vn2);
/* compare depths */loc2pix(inter, (RESOLU *)&ip->rs,
h+0.5-ip->vw.hoff,
v+0.5-ip->vw.voff);
d=TPdpthScan(ip,inter[1])[inter[0]];
if (d*d<=d2) {FVECT vrd;
pix2loc(vrd, &ip->rs, inter[0], inter[1]);
if (viewray(rpos, vrd, &ip->vw, vrd[0], vrd[1])<-FTINY)
return 0;
VSUM(rpos, rpos, vrd, d);
/*    previous    version:   VSUM(rpos,    rpos,    rdir,    t);
*/clr=TPcolrScan(ip,inter[1])[inter[0]];
copycolr(pc, clr);
return 1;
/* got it! */
}
h+=hstep; v+=vstep;
}
return 0; /* didn't hit anything */
}
/* Compute front color and 3-D coord. for preferred view at
this pixel */
static int
TPtapPixel(COLR pc, float pt[3], TapestryObj *tp, int x, int
y)
{
static COLOR ipcolor[36]={
0, 1.492, 0,
2.2627, 0.568644, 0.298338,
3.60996, 0.0447306, 0.206002,
0.499993, 1.23912, 0.573725,
1.18038, 0.908543, 1.2073,
2.26022, 0.392666, 2.12237,
0.87003, 0.845226, 3.12524,
1.0278, 1.01936, 0.6871,
0.390957, 1.31389, 0.247557,
0.98227, 0.868362, 2.42917,
0.515437, 0.89141, 4.09484,
1.34064, 0.649471, 3.22438,
1.70306, 0.795677, 0.239781,
1.1597, 0.92773, 1.09386,
2.19252, 0.592737, 0.336119,
0.194031, 1.28974, 1.29931,
0.196925, 1.40148, 0.135696,
0.0079644, 1.403, 0.890442,
1.27808, 0.76974, 2.23975,
0.542429, 1.24974, 0.291194,
0.294654, 1.11767, 2.66268,
0.73491, 1.17444, 0.282685,
0.93403, 1.04359, 0.819692,
0.125985, 1.42046, 0.229271,
0.184016, 1.32542, 0.972381,
0.728155, 1.11374, 0.935897,
1.27537, 0.868586, 1.23191,
0.917956, 1.08088, 0.500816,
0.254634, 1.19385, 2.04063,
0.128916, 1.42746, 0.145216,
0.934682, 1.09907, 0.245137,
1.15713, 0.745004, 2.9878,
1.11901, 1.02415, 0.265871,
1.09725, 0.954785, 1.0696,
0.807408, 1.13229, 0.421597,
0.144215, 1.41542, 0.206926,
};
COLOR pcolor;
static COLR redcolr={255, 0, 0, COLXS};
VIEW pvw=tp->tvw;
float *offs;
double nf;
RREAL vloc[2];
FVECT rpos, rdir;
int tpos[2];
int i, ibest;
float sc, sbest, tally;
/* average view origins & directions */
pvw.vp[0]=pvw.vp[1]=pvw.vp[2]=0.0;
pvw.vdir[0]=pvw.vdir[1]=pvw.vdir[2]=0.0;
ibest=-1; sbest=0.0;
tally=0.0;
for (i=0; i<tp->ninp; i++) {
if ((sc=TPprScan(tp,i,y)[x])<=FTINY)
continue;
if (sc>sbest) {
ibest=i;
sbest=sc;
}
VSUM(pvw.vp, pvw.vp, tp->inp[i].vw.vp, sc);
VSUM(pvw.vdir, pvw.vdir, tp->inp[i].vw.vdir, sc);
tally+=sc;
}
if (tally <=FTINY) /* nothing here?! */
return -1;
#if 0
copycolor(pcolor, ipcolor[ibest %36]);
nf=(y&1) ? tally: sbest;
scalecolor(pcolor, nf);
```

```
setcolr(pc, pcolor[RED], pcolor[GRN], pcolor[BLU]);
return ibest;
#endif nf=1./tally;
pvw.vp[0] *=nf; pvw.vp[1] *=nf; pvw.vp[2] *=nf;
if (setview(&pvw) !=NULL)
return -1;
/* XXX urp! */
pvw.vdist=1.;
offs=TPoffsum(tp,x,y);
/* where are we in preferred view? */
pix2loc(vloc, &tp->trs, (int)(x+offs[0]*nf+0.5),
(int)(y+offs[1]*nf+0.5));
/* intersect nearest view */
if (viewray(rpos, rdir, &pvw, vloc[0], vloc[1])<-FTINY)
return -1;
if (!TPhitPicture(pc, rpos, rdir, &tp->inp[ibest]))
return -1;
VCOPY(pt, rpos);
/* copy intersection point */
return ibest;
}
/* Output completed tapestry and 3-D coordinate image */
const char *
TPoutputTapestry(const char *pname, const char *cname,
TapestryObj *tp)
{
const int sl=scanlen(&tp->trs);
const int ns=numscans(&tp->trs);
int nbad=0;
int gotFirst;
FILE *pfp, *cfp;
const char *err;
COLR pcolr, apcolr;
float world3d[3], aworld3d[3];
int i, x, y;
/* make sure we have what we need */
if (tp->offs==NULL)
return "missing offsets in TPoutputTapestry( )";
for (i=0; i<tp->ninp; i++)
if (tp->inp[i].pref==NULL)
return "missing preferred views in TPoutputTapestry( )";
/* open output images */
if (pname==NULL II ! *pname) {
pfp=stdout;
SET_FILE_BINARY(pfp);
} else if ((pfp=fopen(pname, "wb"))==NULL)
return "cannot open tapestry picture for output";
if (cname==NULL||!*cname)
cfp=NULL;
else if ((cfp=fopen(cname, "wb"))==NULL)
return "cannot open tapestry coordinates for output";
/* write picture header */
newheader("RADIANCE", pfp);
fputs("Tapestry generated from", pfp);
for (i=0; i<tp->ninp; i++) {
fputs("'", pfp);
fputs(tp->inp[i].fname, pfp);
fputc("\", pfp);
}
fputc('\n', pfp);
fputnow(pfp);
fputs(VIEWSTR, pfp);
fprintview(&tp->tvw, pfp);
fputc('\n', pfp);
fputexpos(tp->inp[0].expval, pfp);
if ((tp->pixaspect <0.98)|(tp->pixaspect>1.02))
fputaspect(tp->pixaspect, pfp);
fputformat(tp->inp[0].fmt, pfp);
fputc('\n', pfp);
fputsresolu(&tp->trs, pfp);
/* output each pixel */
memset(apcolr, 0, sizeof(apcolr));
memset(aworld3d, 0, sizeof(aworld3d));
for (y=0; y<ns; y++) {
memcpy(pcolr, apcolr, sizeof(pcolr));
memcpy(world3d, aworld3d, sizeof(world3d));
gotFirst=0;
for (x=0; x<sl; x++) 1
if (TPtapPixel(pcolr, world3d, tp, x, y)<0) {
++nbad;
/*
memset(pcolr, 0, sizeof(pcolr));
memset(world3d, 0, sizeof(world3d));
*/
} else if (!gotFirst) {
memcpy(apcolr, pcolr, sizeof(apcolr));
memcpy(aworld3d, world3d, sizeof(aworld3d));
gotFirst=1;
}
fwrite(pcolr, sizeof(pcolr), 1, pfp);
if (cfp !=NULL)
fwrite(world3d, sizeof(world3d), 1, cfp);
}
}
/* clean up */
if ((pfp==stdout ? fflush(pfp): fclose(pfp))==EOF)
return "error writing tapestry picture";
if (cfp !=NULL && fclose(cfp)==EOF)
return "error writing tapestry coordinates";
/* XXX temporary bad pixel reporting */
if (nbad)
fprintf(stderr, "%.3f %% missing output pixels\n",
nbad*100./(tp->trs.xr*tp->trs.yr));
return NULL;
}
```

What is claimed is:

1. A method for generating at least one view of a scene from a tapestry image, each of the at least one view being associated with one desired viewpoint of the scene, the method comprising:
providing the tapestry image; wherein the tapestry image comprises a 2 D array of pixels comprising information from a plurality of views associated with the scene;
providing a coordinates map associated with the tapestry image; wherein position data associated with the pixels of the tapestry image comprise depth data for each pixel in the tapestry image; and wherein the position data associated with the pixels of the tapestry image further comprise horizontal disparity data and/or vertical disparity data for each pixel in the tapestry image;
deriving one or more views of the scene based on the tapestry image and the coordinates map.

2. The method according to claim 1, further comprising:
providing reference images of the scene, each reference image being associated with one desired viewpoint; and
generating one or more correction layers, each correction layer being associated with one desired viewpoint, wherein a correction layer associated with a particular desired viewpoint is generated based on the reference image associated with the particular desired viewpoint and the derived view associated with the same particular desired viewpoint,
wherein the generating of the at least one view is further based on the one or more correction layers.

3. The method according to claim 2, wherein each of the one or more correction layers is based on a difference between the reference image associated with the particular desired viewpoint and the derived view associated with the same particular desired viewpoint.

4. The method according to claim 3, wherein the difference comprises subtracting each pixel in the reference image associated with the particular desired viewpoint from a corresponding pixel in the derived view associated with the same particular desired viewpoint.

5. The method according to claim 2, wherein the deriving comprises adding, for each view in the at least one view, a view from the at least one view with a correction layer from the one or more correction layers, and wherein the view and the correction layer are associated with the same desired viewpoint.

6. The method according to claim 1, wherein the deriving comprises performing textured area filling based on the tapestry image and the coordinates map.

7. The method according to claim 1, wherein the providing the tapestry image comprises:
taking pictures of the scene from a plurality of viewpoints of the scene; and
processing the taken pictures to generate the tapestry image.

8. The method according to claim 1, wherein the providing the tapestry image comprises:
generating pictures, using a computer, of the scene for a plurality of viewpoints of the scene; and
processing the computer generated pictures to generate the tapestry image.

9. The method according to claim 6, wherein the processing the tapestry image comprises:
selecting views from the plurality of views of the scene; and
performing a combination based on the selected views to generate the tapestry image.

10. The method according to claim 1, wherein the providing the tapestry image comprises:
performing an analysis of the scene to obtain a plurality of features associated with the scene;
prioritizing each feature in the plurality of features from most important to least important; and
generating the tapestry image such that higher resolution is allocated to features of higher importance than to features of lower importance.

11. The method according claim 10, wherein the performing an analysis is based on one or more of manual allocation of importance, frequency analysis, and saliency analysis.

12. The method according to claim 1, further comprising generating a camera grid, wherein the camera grid comprises identification information of each image in the at least one image of a scene from a tapestry image.

13. The method according to claim 12, wherein the identification information of a particular image comprises at least one of view position, view angle, view direction, orientation, and horizontal and vertical size of the particular image.

14. An encoding system adapted to receive a plurality of input views of a scene, comprising:
a tapestry generator adapted to generate a tapestry image and a coordinates map based on the plurality of input views; wherein the tapestry image comprises a 2 D array of pixels comprising information from the plurality of input views of the scene; wherein position data associated with the pixels of the tapestry image comprise depth data for each pixel in the tapestry image; and wherein the position data associated with the pixels of the tapestry image further comprise horizontal disparity data and/or vertical disparity data for each pixel in the tapestry image; and
an encoder adapted to encode the tapestry image and the coordinates map into a bitstream.

15. The encoding system according to claim 14, further comprising:
a view generation unit adapted to derive one or more views of the scene based on the tapestry image and the coordinates map; and
a subtractor coupled with the view generation unit and adapted to generate a difference between the one or more derived views and the one or more input views, each difference being between a derived view of a particular viewpoint and an input view of the same particular viewpoint, thus generating one or more correction layers,
wherein the encoder is adapted to encode the tapestry image, the coordinates map, and the one or more correction layers into a bitstream.

16. The encoding system according to claim 14, wherein:
the encoding system is further adapted to receive a camera grid, each point in the camera grid being associated with one input view of the scene, and
the view generation unit is adapted to derive the one or more views of the scene based further on the camera grid.

17. The encoding system according to claim 16, wherein each point in the camera grid comprises, for each input view of the scene, information on one or more of view position, view angle, view direction, orientation, and horizontal and vertical size associated with the input view.

18. The encoding system according to claim 16, wherein each point in the camera grid comprises, for each input view of the scene, information on one or more of view position, view angle, view direction, orientation, horizontal and vertical size, and correction layer associated with the input view.

19. A decoding system adapted to receive a bitstream associated with a scene and adapted to generate one or more output images, comprising:
a decoder adapted to decode a tapestry image and a coordinates map from the bitstream, wherein the tapestry image and the coordinates map are associated with a plurality of input views of the scene; wherein the tapestry image comprises a 2 D array of pixels comprising information from the plurality of input views of the scene; wherein position data associated with the pixels of the tapestry image comprise depth data for each pixel in the tapestry image; and wherein the position data associated with the pixels of the tapestry image further comprise horizontal disparity data and/or vertical disparity data for each pixel in the tapestry image; and
a view generation unit adapted to derive the one or more output images of the scene based on the tapestry image and the coordinates map.

20. The decoding system according to claim 19, wherein:
the decoder is further adapted to decode one or more correction layers, each correction layer being associated with one input view of the scene, and
the view generation unit is adapted to derive the one or more output images of the scene based further on the one or more correction layers.

21. The decoding system according to claim 19, wherein:
the decoder is further adapted to decode a camera grid, and
the view generation unit is adapted to derive the one or more output images of the scene based further on the camera grid, wherein each point in the camera grid is associated with one input view of the scene.

22. The decoding system according to claim 20, wherein the view generation unit is adapted to derive a first set of images based on the tapestry image and the coordinates map, the decoding system further comprising:
a combining unit adapted to combine an image from among the first set of images with a corresponding correction layer to generate an output image in the one or more output images, wherein the image from among the first set of images, the correction layer, and the generated output image are associated with the same input view of the scene.

23. The decoding system according to claim 21, wherein each point in the camera grid comprises, for each input view of the scene, information on one or more of view position, view angle, view direction, orientation, and horizontal and vertical size associated with the input view.

24. The decoding system according to claim 21, wherein each point in the camera grid comprises, for each input view of the scene, information on one or more of view position, view angle, view direction, orientation, horizontal and vertical size, and correction layer associated with the input view.

25. The decoding system according to claim 19, wherein the view generation unit is adapted to derive the one or more output images of the scene by performing textured area filling based on the tapestry image and the coordinates map.

* * * * *